United States Patent
Tsuchiya

(10) Patent No.: US 11,963,265 B2
(45) Date of Patent: Apr. 16, 2024

(54) COMMUNICATION APPARATUS AND CONTROL METHOD FOR COMMUNICATION APPARATUS

(71) Applicant: CANON KABUSHIKI KAISHA, Tokyo (JP)

(72) Inventor: Keigo Tsuchiya, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 399 days.

(21) Appl. No.: 17/353,947

(22) Filed: Jun. 22, 2021

(65) Prior Publication Data

US 2021/0315056 A1    Oct. 7, 2021

Related U.S. Application Data

(63) Continuation of application No. PCT/JP2019/044633, filed on Nov. 14, 2019.

(30) Foreign Application Priority Data

Dec. 28, 2018  (JP) .................................. 2018-248377

(51) Int. Cl.
*H04W 84/20* (2009.01)
*H04W 4/80* (2018.01)
(Continued)

(52) U.S. Cl.
CPC .............. *H04W 84/20* (2013.01); *H04W 4/80* (2018.02); *H04W 72/0453* (2013.01); *H04W 84/10* (2013.01)

(58) Field of Classification Search
None
See application file for complete search history.

(56) References Cited

U.S. PATENT DOCUMENTS 8,400,938 B2   3/2013  Matsuura
10,326,666 B2  6/2019  Aoki
(Continued)

FOREIGN PATENT DOCUMENTS

JP   2010-278825 A   12/2010
JP   2018-019366 A    2/2018
(Continued)

OTHER PUBLICATIONS

PCT International Search Report dated Jan. 29, 2020, in related PCT Application No. PCT/JP2019/044633.

*Primary Examiner* — Christine T Duong
(74) *Attorney, Agent, or Firm* — VENABLE LLP

(57) ABSTRACT

A communication apparatus can execute a first communication mode for allowing wireless communication with an information processing apparatus via an external access point. Also, the communication apparatus can execute a second communication mode for allowing the communication apparatus to function as a master station without intervention of the external access point to perform wireless communication with the information processing apparatus serving as a slave station. Furthermore, the communication apparatus can execute a third communication mode of a standard different from standards of the first communication mode and the second communication mode. The communication apparatus controls not to execute communication in either the second communication mode or the third communication mode based on a frequency band used in the first communication mode.

16 Claims, 20 Drawing Sheets

(51) Int. Cl.
*H04W 72/0453* (2023.01)
*H04W 84/10* (2009.01)

(56) References Cited

U.S. PATENT DOCUMENTS

| | | |
|---|---|---|
| 10,791,554 B2 | 9/2020 | Aoyama |
| 2010/0302966 A1 | 12/2010 | Matsuura |
| 2018/0034707 A1 | 2/2018 | Aoki |
| 2019/0261243 A1* | 8/2019 | Amini .............. H04N 21/43637 |
| 2019/0261440 A1* | 8/2019 | Lim ...................... H04W 76/14 |

FOREIGN PATENT DOCUMENTS

| | | |
|---|---|---|
| JP | 2018-191093 A | 11/2018 |
| WO | 2013/150647 A1 | 10/2013 |

* cited by examiner

FIG. 12

```
SELECT IF

1. WIRELESS LAN
2. WIRED LAN
3. USB
```

FIG. 14

| No. | BLE MODE | COMMUNICATION MODE SETTINGS (FREQUENCY BAND) | |
|---|---|---|---|
| | | WIRELESS INFRASTRUCTURE MODE | P2P MODE |
| 1 | ACTIVE | INACTIVE | INACTIVE |
| 2 | ACTIVE | ACTIVE (2.4GHZ) | INACTIVE |
| 3 | ACTIVE | ACTIVE (5GHZ INCLUDING DFS USAGE BAND) | INACTIVE |
| 4 | ACTIVE | INACTIVE | ACTIVE (2.4GHZ) |
| 5 | ACTIVE | INACTIVE | ACTIVE (5GHZ EXCLUDING DFS USAGE BAND) |
| 6 | ACTIVE | ACTIVE (2.4GHZ) | ACTIVE (2.4GHZ) |
| 7 | ACTIVE | ACTIVE (5GHZ EXCLUDING DFS USAGE BAND) | ACTIVE (5GHZ EXCLUDING DFS USAGE BAND) |
| 8 | INACTIVE | ACTIVE (2.4GHZ) | INACTIVE |
| 9 | INACTIVE | ACTIVE (5GHZ INCLUDING DFS USAGE BAND) | INACTIVE |
| 10 | INACTIVE | INACTIVE | ACTIVE (2.4GHZ) |
| 11 | INACTIVE | INACTIVE | ACTIVE (5GHZ EXCLUDING DFS USAGE BAND) |
| 12 | INACTIVE | ACTIVE (2.4GHZ) | ACTIVE (2.4GHZ) |
| 13 | INACTIVE | ACTIVE (2.4GHZ) | ACTIVE (5GHZ EXCLUDING DFS USAGE BAND) |
| 14 | INACTIVE | ACTIVE (5GHZ INCLUDING DFS USAGE BAND) | ACTIVE (2.4GHZ) |
| 15 | INACTIVE | ACTIVE (5GHZ INCLUDING DFS USAGE BAND) | ACTIVE (5GHZ EXCLUDING DFS USAGE BAND) |

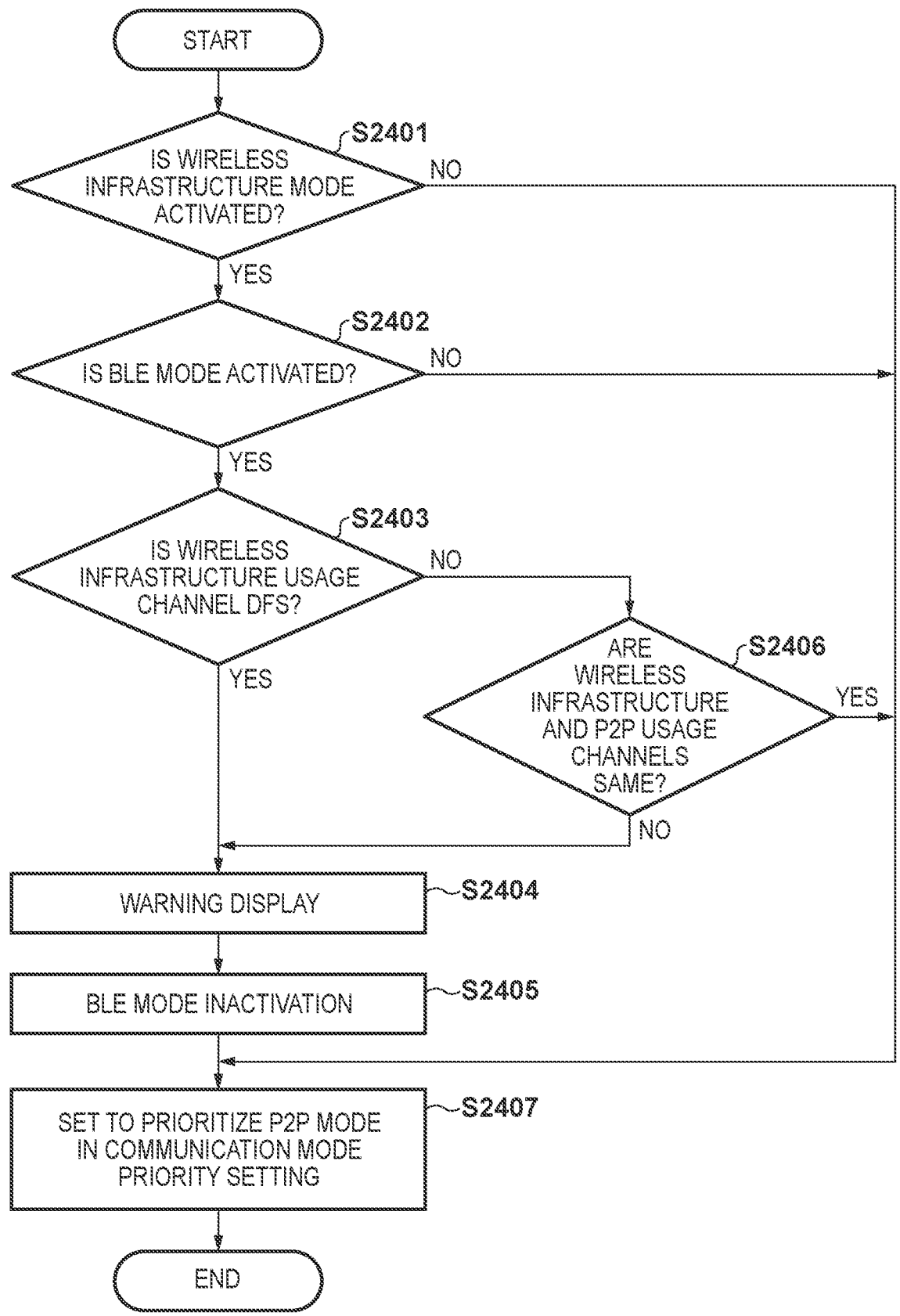

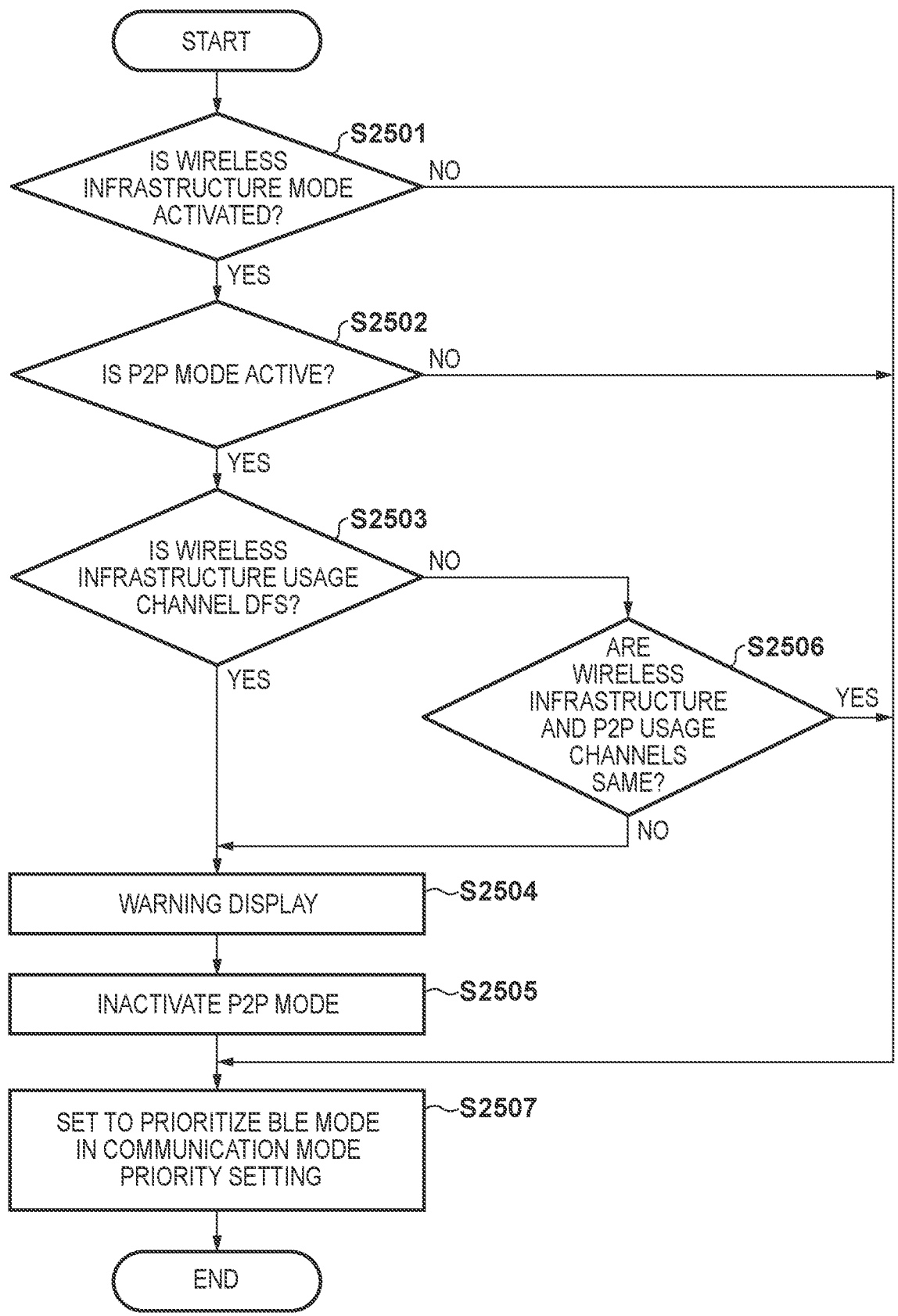

COMMUNICATION APPARATUS AND CONTROL METHOD FOR COMMUNICATION APPARATUS

CROSS-REFERENCE TO RELATED APPLICATIONS

This application is a Continuation of International Patent Application No. PCT/JP2019/044633, filed Nov. 14, 2019, which claims the benefit of Japanese Patent Application No. 2018-248377, filed Dec. 28, 2018, both of which are hereby incorporated by reference herein in their entirety.

BACKGROUND OF THE INVENTION

Field of the Invention

The present invention relates to a communication technique.

Background Art

A wireless LAN system has conventionally been used as a network system that is not restricted by a communication cable and has good portability. Particularly, in recent years, the wireless LAN system has spread drastically due to improvement in the transmission speed between wireless communication sections, the spread of wireless communication apparatuses, and the like.

In particular, a wireless LAN system defined by IEEE802.11 standards has become widespread in general as a wireless LAN system using the frequency bands of the 2.4-GHz and 5-GHz bands.

For the purpose of short-range wireless communication using the frequency band of the 2.4-GHz band, the Bluetooth® and Bluetooth Low Energy (to be referred to as "BLE" hereinafter) standards have become widespread in general. With respect to a printer, connectivity to another apparatus is an important element and it is required to support a plurality of communication standards.

PTL 1 discloses a technique in which a channel is automatically changed to another free channel in a case in which radio waves of various kinds of radars such as the weather radar are detected in a wireless base station by wireless communication in the 5 GHz band and the communication needs to be interrupted for a predetermined time. This technique is DFS (Dynamic Frequency Selection). Additionally, since there is also a radio interference avoidance function called TPC (Transmit Power Control) in addition to DFS, it is necessary to pay attention to TPC in a similar manner. W52, W53, W56, W58, and the like are bands used in the 5-GHz band, and usable bands are regulated in accordance with the law of the country or the region. Among these bands, W53 and W56 are the bands in which DFS is executed.

For example, in Japan, W52 (5.2-GHz band (5150 to 5250 MHz)), W53 (5.3-GHz band (5250 to 5350 MHz)), and W56 (5.6-GHz band (5470 to 5725 MHz)) are defined as the usable bands in the 5-GHz band. W52 is the only band that does not receive the interference wave due to DFS. For example, W52 uses channels 36, 40, 44, and 48.

With respect to a communication apparatus such as a printing apparatus as well, connectivity to another apparatus is an important element and it is desirable to use both the 5- and 2.4-GHz bands. However, if such communication apparatus can execute a plurality of wireless communication modes, it may be impossible to maintain necessary throughput or the like. The present invention provides a technique for implementing communication while maintaining necessary throughput.

CITATION LIST

Patent Literature

PTL 1: Japanese Patent Laid-Open No. 2010-278825

SUMMARY OF THE INVENTION

According to the first aspect of the present invention, there is provided a communication apparatus capable of executing wireless communication using a first frequency band and wireless communication using a second frequency band including a specific frequency band, comprising: a communication unit configured to allow to execute a first communication mode for allowing wireless communication with an information processing apparatus via an external access point, a second communication mode for allowing the communication apparatus to function as a master station without intervention of the external access point to perform wireless communication with the information processing apparatus serving as a slave station, and a third communication mode of a standard different from standards of the first communication mode and the second communication mode; and a control unit configured to control the communication unit, wherein the control unit controls not to execute communication in either the second communication mode or the third communication mode based on a frequency band used in the first communication mode.

According to the second aspect of the present invention, there is provided a non-transitory computer-readable storage medium storing a program for causing a computer capable of executing wireless communication using a first frequency band and wireless communication using a second frequency band including a specific frequency band to function as: a communication unit configured to allow to execute a first communication mode for allowing wireless communication with an information processing apparatus via an external access point, a second communication mode for allowing the communication apparatus to function as a master station without intervention of the external access point to perform wireless communication with the information processing apparatus serving as a slave station, and a third communication mode of a standard different from standards of the first communication mode and the second communication mode; and a control unit configured to control the communication unit, wherein the control unit controls not to execute communication in either the second communication mode or the third communication mode based on a frequency band used in the first communication mode.

According to the third aspect of the present invention, there is provided a control method for a communication apparatus capable of executing wireless communication using a first frequency band and wireless communication using a second frequency band including a specific frequency band, comprising: causing a communication unit to execute a first communication mode for allowing wireless communication with an information processing apparatus via an external access point, a second communication mode for allowing the communication apparatus to function as a master station without intervention of the external access point to perform wireless communication with the information processing apparatus serving as a slave station, and a third communication mode of a standard different from standards of the first communication mode and the second communication mode, wherein control is executed not to execute communication in either the second communication mode or the third communication mode based on the frequency band used in the first communication mode.

Further features of the present invention will become apparent from the following description of exemplary embodiments with reference to the attached drawings.

BRIEF DESCRIPTION OF THE DRAWINGS

FIG. 12 is a view showing an interface selection screen at the time of initial activation;

FIG. 14 is a table for explaining communication mode settings;

FIG. 24 is a flowchart of conditional BLE mode inactivation execution processing;

FIG. 25 is a flowchart of conditional P2P mode inactivation execution processing;

DESCRIPTION OF THE EMBODIMENTS

The embodiments of the present invention will be described below with reference to the accompanying drawings. Note that the embodiments to be described below are examples of detailed implementation of the present invention or detailed examples of the arrangement described in the appended claims.

First Embodiment

<Configuration of System>

Figure 1:
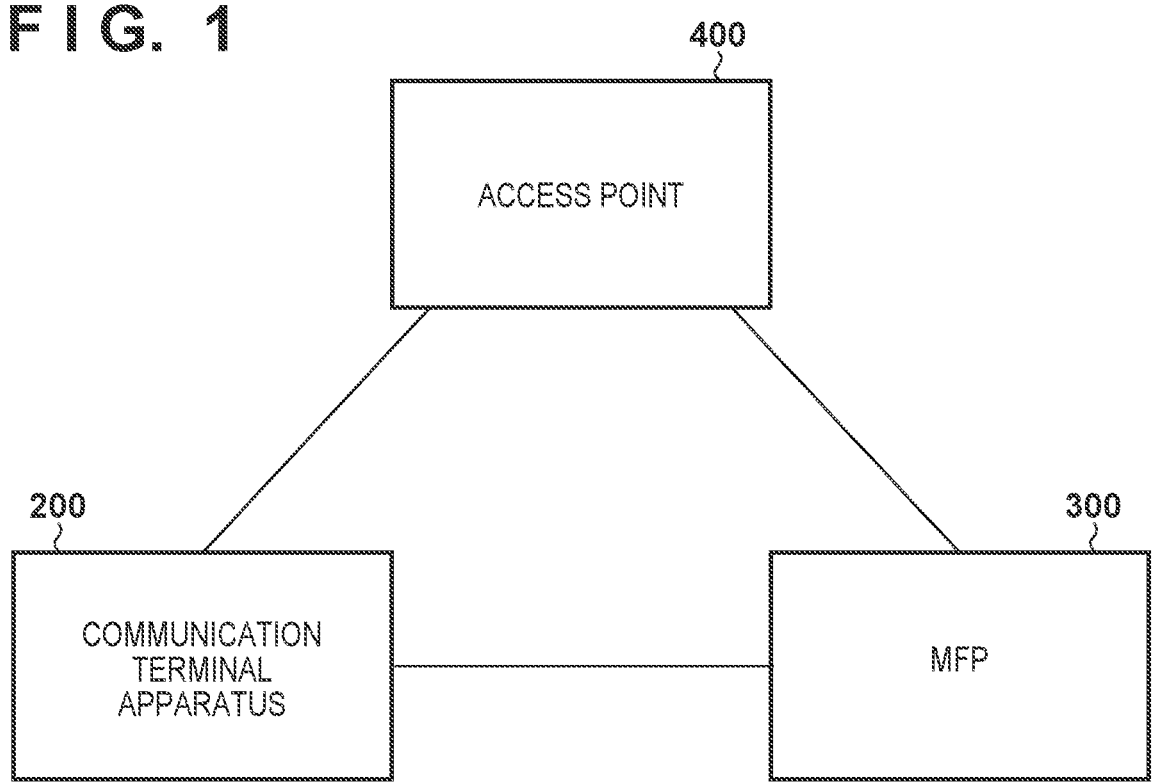
FIG. 1 is a view showing an example of the configuration of a system.

An example of the configuration of a system according to this embodiment will be described with reference to FIG. 1. As shown in FIG. 1, the system according to this embodiment includes a mobile communication terminal apparatus 200, an access point (wireless base station) 400, and an MFP (MultiFunction Peripheral) 300.

The communication terminal apparatus 200 is an information processing apparatus including a wireless LAN (WLAN) communication unit that performs communication using a WLAN and a Bluetooth (BT) communication unit that performs communication using BT. That is, the communication terminal apparatus 200 is an apparatus having a wireless communication function. The communication terminal apparatus 200 is, for example, a personal information terminal such as a PDA (Personal Digital Assistant), a mobile phone, a digital camera, or the like.

The MFP 300 is an apparatus that can wirelessly communicate with the communication terminal apparatus 200, and includes a WLAN communication unit. The MFP 300 has a printing function of printing an image and characters on a print medium such as a paper sheet, and a scan function of reading information printed on the print medium. The MFP 300 may also have a FAX function, a telephone function, and the like. Another apparatus may be incorporated in the system in addition to or instead of the MFP 300 as long as it can wirelessly communicate with the communication terminal apparatus 200. For example, a printer, facsimile apparatus, scanner apparatus, projector, mobile terminal, smartphone, notebook PC, tablet terminal, PDA, digital camera, music playback device, television, and the like may be incorporated in the system.

The access point 400 includes a WLAN communication unit, and provides communication in the wireless infrastructure mode by relaying communication between apparatuses that have been permitted to be connected to the access point. That is, in communication in the wireless infrastructure mode, the access point 400 functions as a master station and has the right to determine a frequency to be used by another communication apparatus (slave station). The communication terminal apparatus 200 and the MFP 300 may use their WLAN communication units to perform wireless communication in the wireless infrastructure mode via the access point 400. The communication terminal apparatus 200 and the MFP 300 may perform P2P communication (Peer-to-Peer communication) in the Wi-Fi Direct® or software AP mode. Furthermore, the communication terminal apparatus 200 and the MFP 300 may use their BT communication units to perform P2P communication.

The respective modes will be described in detail later with reference to FIGS. 7 to 10. Note that the communication terminal apparatus 200 and the MFP 300 can execute processing corresponding to a plurality of print services via the WLAN, as will be described later.

Figure 2:
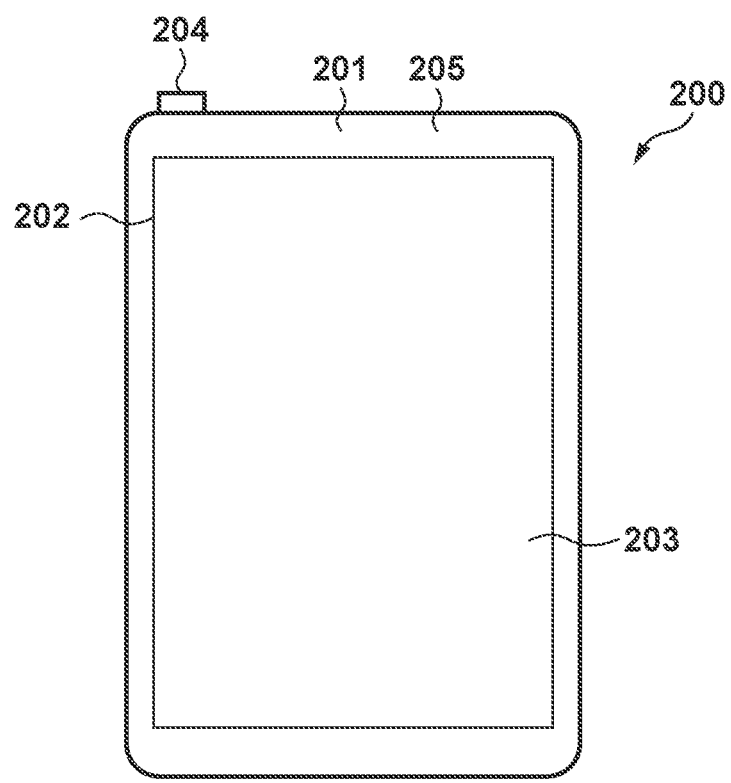
FIG. 2 is a view showing an example of the outer appearance of a communication terminal apparatus 200.

FIG. 2 is a view showing an example of the outer appearance of the communication terminal apparatus 200. In this embodiment, assume that the communication terminal apparatus 200 is a smartphone. The smartphone indicates a multi-function mobile phone that incorporates a camera, a web browser, an email function, and the like in addition to functions of a mobile phone.

A WLAN unit 201 is a communication module (communication chip) for performing communication (wireless communication) by a WLAN. Assume that the WLAN unit 201 can perform data (packet) communication in a WLAN system complying with, for example, the IEEE802.11 series (IEEE802.11a, IEEE802.11n (Wi-Fi 4), IEEE802.11ac (Wi-Fi 5), IEEE802.11ax (Wi-Fi 6), and the like). In this embodiment, the WLAN unit 201 can perform communication both in the 2.4- and 5-GHz bands. Furthermore, in wireless communication using the WLAN unit 201, communication based on Wi-Fi Direct (WFD), communication in the software AP mode, communication in the wireless infrastructure mode, and the like are possible. The respective modes will be described in detail later with reference to FIGS. 7 to 9.

A BT unit 205 is a communication module (communication chip) for performing wireless communication complying with the IEEE802.15.1 standard. The BT unit 205 can perform communication in the 2.4-GHz band used by BT 1.1 to 5.0 such as Bluetooth BR/EDR, Bluetooth+HS, and Bluetooth Low Energy. In the following description, communication by BT 1.1 to 5.0 including Bluetooth BR/EDR, Bluetooth+HS, and Bluetooth Low Energy will sometimes be referred to as "BT" hereinafter. Note that in BT communication, frequency hopping for performing communication by switching a channel to be used is performed in the 2.4-GHz band. BT will be described in detail later with reference to FIGS. 10 and 11.

A display unit 202 is, for example, a display including an LCD type display mechanism. An operation unit 203 includes a touch-panel operation mechanism, and detects an operation by the user. As a representative operation method, the display unit 202 displays button icons and a software keyboard, and when the user touches them, operation events are detected. A power key 204 is a hard key operated by the user to instruct to power on/off the communication terminal apparatus 200.

Figure 3:
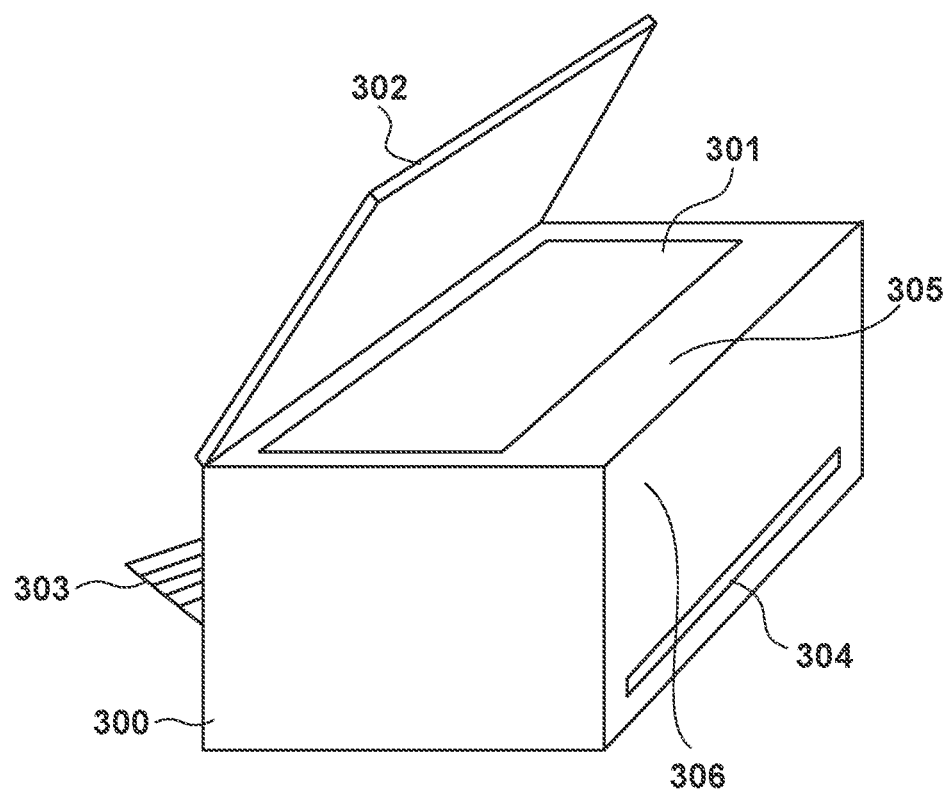
FIG. 3 is a view showing an example of the outer appearance of an MFP 300.

FIG. 3 is a view showing an example of the outer appearance of the MFP 300. Referring to FIG. 3, a document table 301 is a table on which a document to be read by a scanner (reading unit) is placed, and a cover 302 is a cover used to press a document placed on the document table 301 and prevent external leakage of light from a light source, with which the document is irradiated at the time of reading. A printing paper insertion port 303 is an insertion port on which paper sheets of various sizes can be set. Paper sheets set on the printing paper insertion port 303 are conveyed one by one to a printing unit, and are discharged from a printing paper discharge port 304 after they are printed by the printing unit. An operation display unit 305 includes keys such as character input keys, cursor keys, an enter key, and a cancel key and an LED (Light Emitting Diode) or an LCD (Liquid Crystal Display), and can be used by the user to activate various functions of the MFP 300 or make various settings. The operation display unit 305 may be formed by a touch panel.

A wireless communication module 306 is a communication module (chip) for performing WLAN or BT communication, and is provided in the MFP 300. By using the wireless communication module 306, communication in the 2.4- or 5-GHz band by a WLAN or BT can be performed. That is, the wireless communication module 306 can perform data (packet) communication in the WLAN system complying with, for example, the IEEE802.11 series (IEEE802.11a, IEEE802.11n (Wi-Fi 4), IEEE802.11ac (Wi-Fi 5), IEEE802.11ax (Wi-Fi 6), and the like). In wireless communication using the wireless communication module 306, communication based on Wi-Fi Direct (WFD), communication in the software AP mode, communication in the wireless infrastructure mode, and the like are possible. The respective modes will be described in detail later with reference to FIGS. 7 to 9.

Furthermore, the wireless communication module 306 can perform wireless communication complying with the IEEE802.15.1 standard. That is, the wireless communication module 306 can perform communication in the 2.4-GHz band used by BT 1.1 to 5.0 such as Bluetooth BR/EDR, Bluetooth+HS, and Bluetooth Low Energy. Note that in BT communication, frequency hopping for performing communication by switching a channel to be used is performed in the 2.4-GHz band. BT will be described in detail later with reference to FIGS. 10 and 11.

Figure 4A:
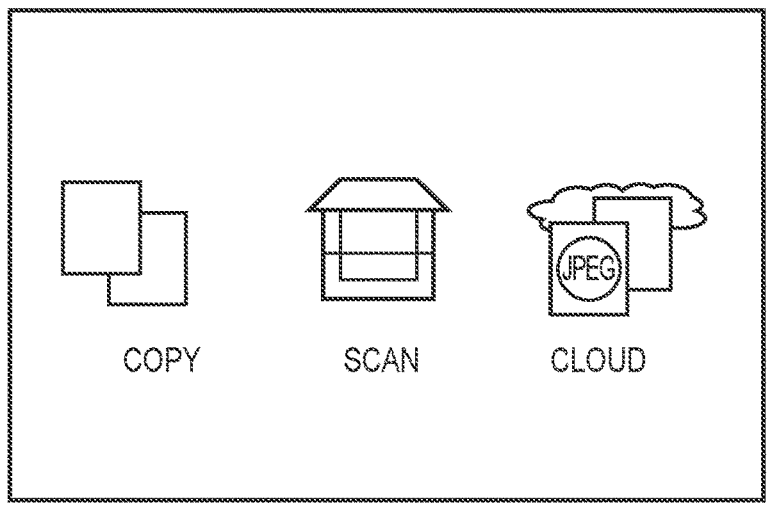
FIG. 4A is a view schematically showing an example of screen display on an operation display unit 305 of the MFP.
Figure 4B:
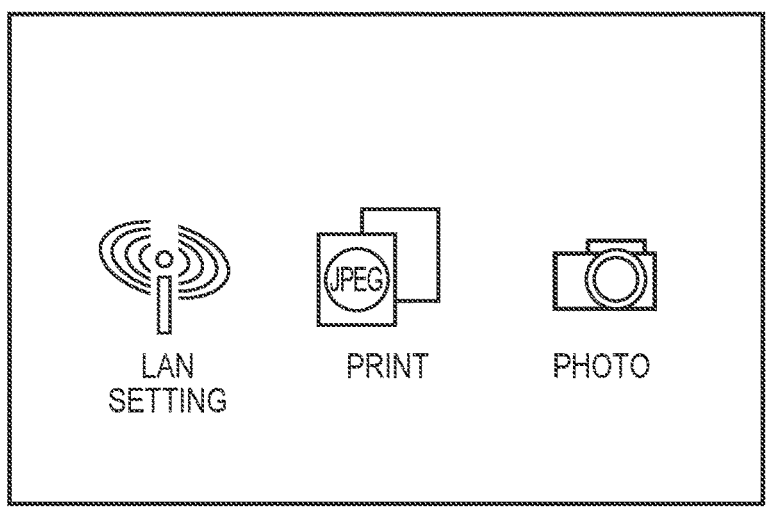
FIG. 4B is a view schematically showing another example of screen display on the operation display unit 305 of the MFP.
Figure 4C:
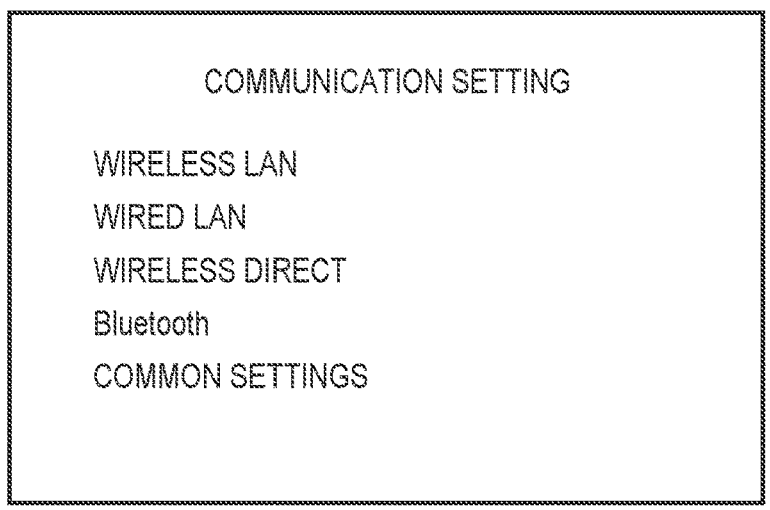
FIG. 4C is a view schematically showing still another example of screen display on the operation display unit 305 of the MFP.

FIGS. 4A to 4C are views each schematically showing an example of screen display on the operation display unit 305 of the MFP. FIG. 4A shows a home screen in the MFP 300, which is a screen displayed on the operation display unit 305 in a state (idle state) in which the MFP 300 is powered on and does not perform an operation such as a print or scan operation.

On the home screen, an icon (icon at the left end) for instructing execution of a copy operation and various settings concerning the copy operation, and an icon (icon at the center) for instructing execution of a scan operation and various settings concerning the scan operation are displayed. In addition, on the home screen, an icon (icon at the right end) for instructing execution of a cloud function using Internet communication and various settings concerning the cloud function is displayed. The user can instruct the MFP 300 to perform corresponding processing by touching a desired icon by a key operation or a touch panel operation.

It is possible to display, on the operation display unit 305, a screen different from that shown in FIG. 4A seamlessly from the home screen shown in FIG. 4A by the key operation or the touch panel operation. FIG. 4B shows an example of the screen, which is used to instruct execution of a print or photo function and a communication setting (LAN setting). FIG. 4C shows a communication setting screen displayed on the operation display unit 305 when the user touches the icon (the icon of "LAN setting") at the left end on the screen shown in FIG. 4B. It is possible to make, using this communication setting screen, various LAN settings such as the active/inactive setting of the wireless infrastructure mode and the active/inactive setting of the P2P mode such as the WFD or software AP mode, and a BT setting such as the active/inactive setting of BT. It is also possible to set the frequency band or channel of the wireless LAN and a code for BT pairing on this communication setting screen.

The wireless infrastructure mode will sometimes be referred to as the first communication mode hereinafter, the P2P method such as the WFD or software AP mode will sometimes be referred to as the second communication mode hereinafter, and the P2P method using BT such as the BLE mode and the BT Classic mode will sometimes be referred to as the third communication mode hereinafter.

Example of Hardware Arrangement of Communication Terminal Apparatus 200

Figure 5:
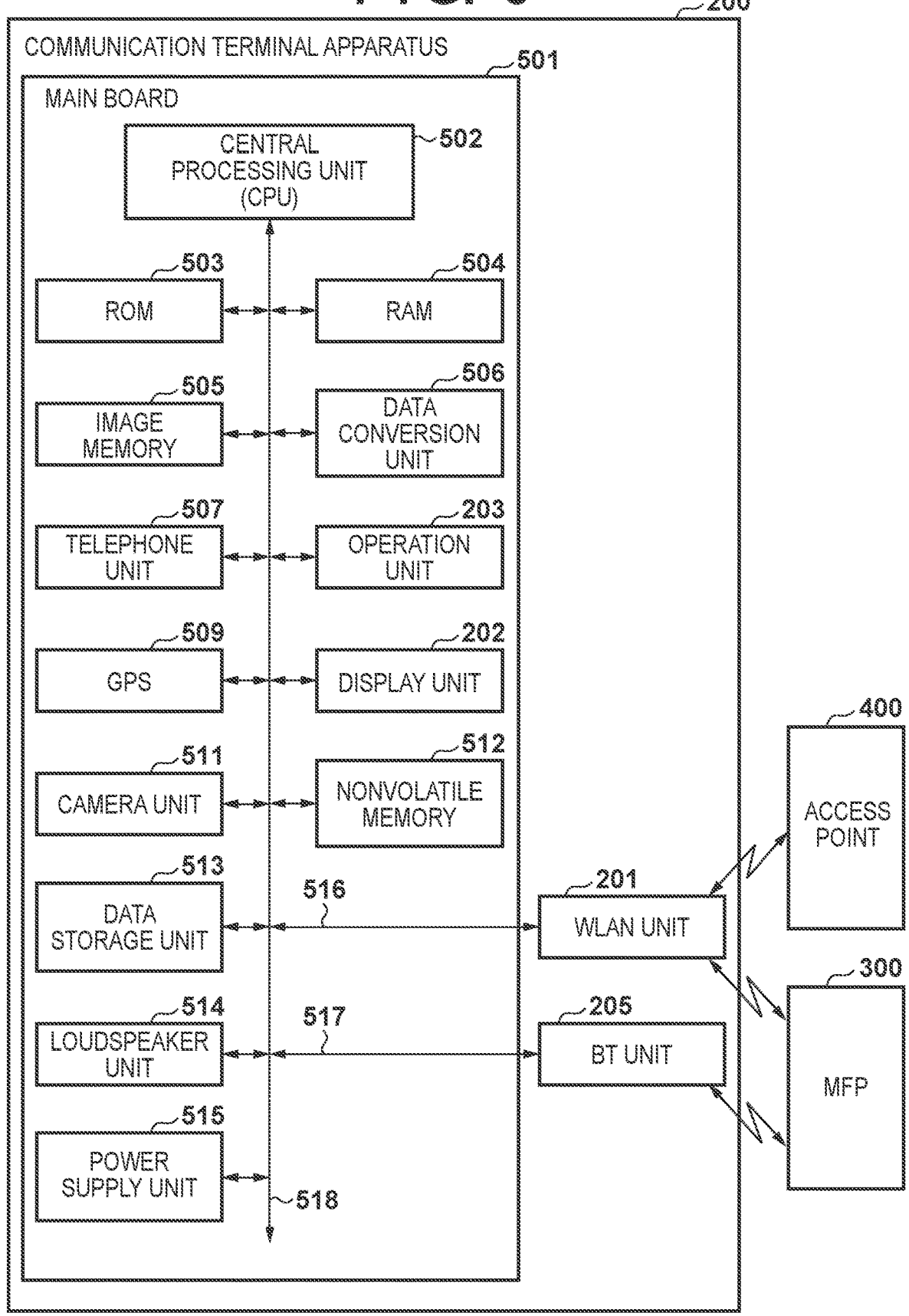
FIG. 5 is a block diagram showing an example of the hardware arrangement of the communication terminal apparatus 200.

An example of the hardware arrangement of the communication terminal apparatus 200 will be described with reference to a block diagram shown in FIG. 5. As shown in FIG. 5, the communication terminal apparatus 200 includes a main board 501 for executing main control of the communication terminal apparatus 200, the WLAN unit 201 for performing WLAN communication, and the BT unit 205 for performing BT communication.

The main board 501 will first be described. A central processing unit (CPU) 502 is a system control unit, and executes various kinds of processes using computer programs and data stored in a ROM 503, a RAM 504, an image memory 505, a nonvolatile memory 512, a data storage unit 513, and the like. This causes the CPU 502 to control the overall operation of the communication terminal apparatus 200 and to execute or control each process described as that executed by the communication terminal apparatus 200.

The ROM 503 stores control programs to be executed by the CPU 502, an embedded operating system (OS) program, and the like. In this embodiment, the respective control programs stored in the ROM 503 execute software control such as scheduling and task switching under the management of the embedded OS stored in the ROM 503.

The RAM 504 is implemented by an SRAM (Static RAM) or the like. The RAM 504 has an area to store a computer program and data loaded from the ROM 503, the nonvolatile memory 512, or the like, and a computer program and data externally received by the WLAN unit 201 or the BT unit 205. The RAM 504 also has a work area used by the CPU 502 to execute various kinds of processes. In this way, the RAM 504 can provide various areas appropriately.

The image memory 505 is implemented by a memory such as a DRAM (Dynamic RAM), and temporarily stores an image externally received by the WLAN unit 201 or the BT unit 205 and an image read out from the data storage unit 513 so as to be processed by the CPU 502.

A data conversion unit 506 appropriately converts data transmitted/received by the communication terminal apparatus 200 in accordance with the purpose. For example, the data conversion unit 506 executes analysis of data of various formats, and data conversion such as color conversion and image conversion.

A telephone unit 507 controls a telephone line, and implements telephone communication by processing audio data input/output via a loudspeaker unit 514. The loudspeaker unit 514 realizes a speech output function, an alarm notification function, and the like in addition to a speech input function for a telephone function.

A GPS (Global Positioning System) 509 obtains position information such as the current latitude and longitude of the communication terminal apparatus 200 by a known position measurement technique.

A camera unit 511 encodes an image input via a lens, and saves the encoded image in the data storage unit 513. Note that the save destination of the encoded image generated by the camera unit 511 is not limited to the data storage unit 513 and may be, for example, the nonvolatile memory 512. The input image may be saved without being encoded.

The nonvolatile memory 512 is implemented by a memory such as a flash memory, and continuously stores data even after the communication terminal apparatus 200 is powered off. Note that the memory of the communication terminal apparatus 200 is not limited to that shown in FIG. 5. For example, the image memory 505 and the RAM 504 may be implemented by the same memory, or data may be backed up in the data storage unit 513. In this embodiment, a DRAM is used as the image memory 505. However, another memory device such as a hard disk or a nonvolatile memory may be applied to the image memory 505.

A power supply unit 515 is implemented by a portable battery, and controls power supply to the communication terminal apparatus 200. A power supply state includes a battery dead state in which the battery has no remaining amount, a power-off state in which the power key 204 is operated to power off the apparatus, an active state in which the apparatus is normally active, and a power saving state in which the apparatus is active but is set in a power saving mode.

As described above, the communication terminal apparatus 200 can perform WLAN or BT wireless communication by the WLAN unit 201 or the BT unit 205. That is, the WLAN unit 201 can perform wireless communication complying with the IEEE802.11 series. The BT unit 205 can perform wireless communication complying with the IEEE802.15.1 standard. This causes the communication terminal apparatus 200 to perform data communication with another device such as the MFP 300. When performing data transmission, each of the WLAN unit 201 and the BT unit 205 converts data to be transmitted into packets and then transmits the packets to the other device. Conversely, when performing data reception, each of the WLAN unit 201 and the BT unit 205 reconstructs packets from another external device into original data. Each of the WLAN unit 201 and the BT unit 205 is a unit for implementing communication complying with the standard.

The WLAN unit 201 can concurrently execute two communication modes of, for example, the wireless infrastructure mode as the first communication mode and the P2P mode (WFD or software AP mode or the like) as the second communication mode. The BT unit 205 can provide, as the third communication mode, a communication mode complying with BT 1.1 to 5.0. Note that the frequency band used in each of these communication modes may be limited by the hardware function or performance. The respective functional units of the main board 501 are connected to each other via a system bus 518 managed by the CPU 502.

Example of Hardware Arrangement of MFP 300

Figure 6:
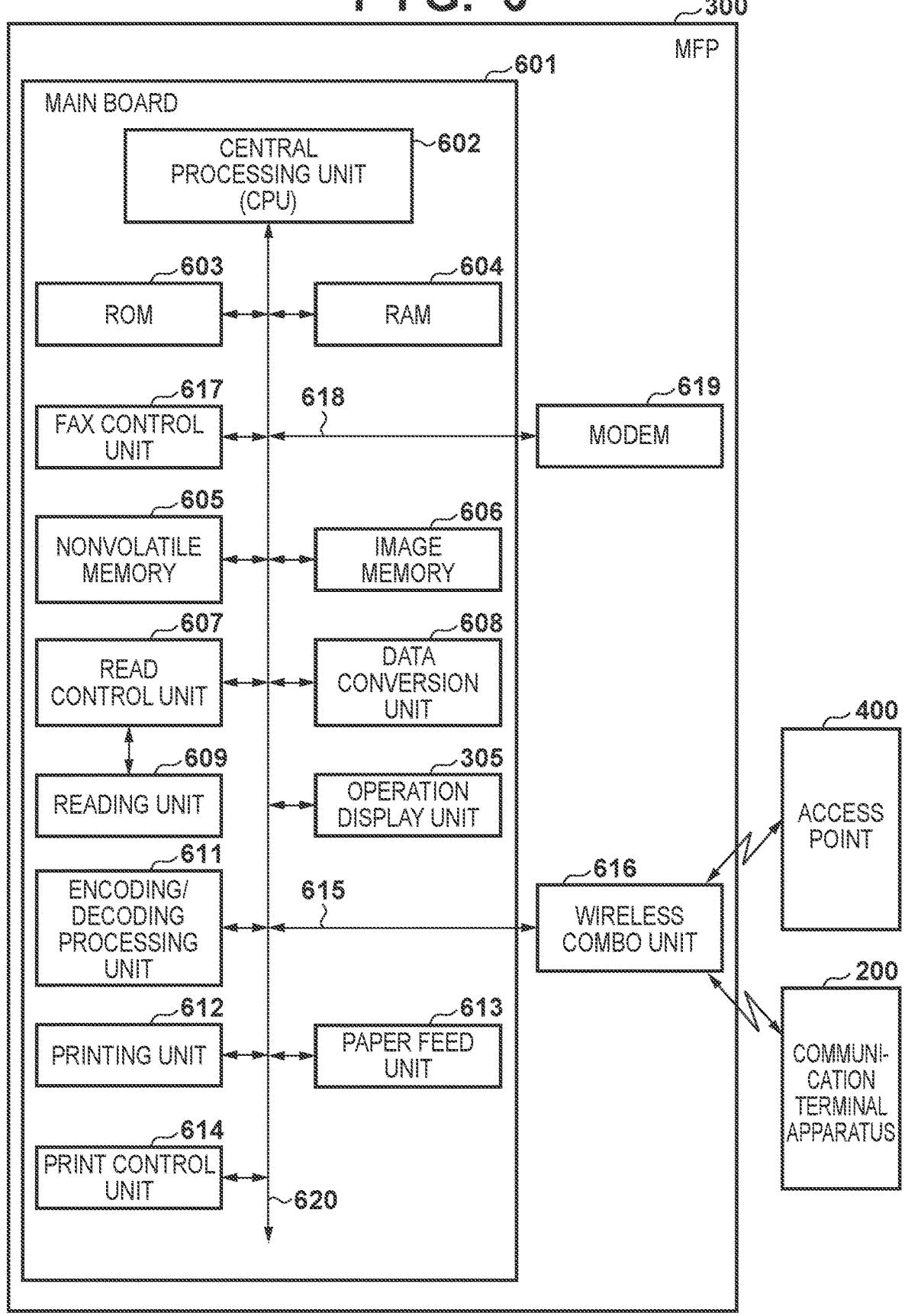
FIG. 6 is a block diagram showing an example of the hardware arrangement of the MFP 300.

An example of the hardware arrangement of the MFP 300 will be described with reference to a block diagram shown in FIG. 6. The MFP 300 includes a main board 601 for executing main control of the MFP 300 and a wireless combo unit 616 for performing WLAN communication and BT communication by one module.

The main board 601 will first be described. A central processing unit (CPU) 602 is a system control unit, and executes various kinds of processes using computer programs and data stored in a ROM 603, a RAM 604, a nonvolatile memory 605, an image memory 606, and the like. This causes the CPU 602 to control the overall operation of the MFP 300 and to execute or control each process described as that executed by the MFP 300.

The ROM 603 stores control programs to be executed by the CPU 602, an embedded operating system (OS) program, and the like. In this embodiment, the respective control programs stored in the ROM 603 execute software control such as scheduling and task switching under the management of the embedded OS stored in the ROM 603.

The RAM 604 is implemented by an SRAM (Static RAM) or the like. The RAM 604 has an area to store a computer program and data loaded from the ROM 603, the nonvolatile memory 605, or the like, and a computer program and data externally received by the wireless combo unit 616. The RAM 604 also has a work area used by the CPU 602 to execute various kinds of processes. In this way, the RAM 604 can provide various areas appropriately.

The nonvolatile memory 605 is implemented by a memory such as a flash memory, and continuously stores information even after the MFP 300 is powered off. Note that the memory of the MFP 300 is not limited to that shown in FIG. 6.

The image memory 606 is implemented by a memory such as a DRAM (Dynamic RAM), and stores an image externally received by the wireless combo unit 616 and an image processed by an encoding/decoding processing unit 611.

A read control unit 607 controls a reading unit 609 (for example, a CIS image sensor (contact type image sensor)) to optically read information on a document, convert the read result into an image, and output the image. Note that the read control unit 607 may perform various kinds of image processes such as binarization processing and halftone processing for the image, and then output the resultant data.

A data conversion unit 608 appropriately converts data transmitted/received by the MFP 300 in accordance with the purpose. For example, the data conversion unit 608 executes analysis of data of various formats, processing of converting image data into print data, and the like.

The encoding/decoding processing unit 611 executes encoding/decoding complying with JPEG, PNG, or the like and enlargement/reduction processing for the image handled by the MFP 300.

A printing unit 612 is, for example, an inkjet printer that prints an image and characters on a print medium by discharging, from a printhead, ink supplied from an ink tank.

A paper feed unit 613 holds a print medium to be supplied to the printing unit 612. The print medium held by the paper feed unit 613 is supplied to the printing unit 612 under the control of a print control unit 614, and the printing unit 612 prints an image and characters on the supplied print medium, and outputs it.

The paper feed unit 613 can prepare a plurality of paper feed units so as to hold a plurality of types of print media in one apparatus. Then, the print control unit 614 can control to select a paper feed unit to feed paper sheets.

The print control unit 614 performs various kinds of image processes such as smoothing processing, printing density correction processing, and color correction for the image to be printed on the print medium, and outputs the resultant data to the printing unit 612. The print control unit 614 also serves to periodically read out information of the printing unit 612, and update information in the RAM 604. More specifically, the print control unit 614 updates, by the new readout status information, "information of the printing unit 612 (status information such as the remaining amount of an ink tank and a printhead state)" held in the RAM 604. The respective functional units of the main board 601 are connected to each other via a system bus 620 managed by the CPU 602. A FAX control unit 617 performs various control processes concerning facsimile communication with an external apparatus.

The wireless combo unit 616 having both the functions of the WLAN unit 201 and the BT unit 205 provided in the communication terminal apparatus 200 is mounted on the MFP 300. That is, the wireless combo unit 616 can perform wireless communication complying with the IEEE802.11 series and wireless communication complying with the IEEE802.15.1 standard. Note that the wireless combo unit 616 corresponds to the wireless communication module 306 shown in FIG. 3. The wireless combo unit 616 is connected to the main board 601 via a bus cable 615. Furthermore, a modem 619 is also connected to the main board 601 via a bus cable 618. Note that the communication terminal apparatus 200 and the MFP 300 can perform communication based on WFD, and have a software access point (software AP).

<P2P (Peer-to-Peer) Method>

As a method of implementing P2P (a method in which apparatuses directly, wirelessly communicate with each other without intervention of an external access point) in WLAN communication, there are provided a plurality of modes. In each mode, a search-side apparatus searches for an apparatus (communication partner apparatus or opposite apparatus) as a communication partner using the same apparatus search request (for example, a Probe Request frame or Beacon), and then discovers it. If the MFP 300 is activated by the P2P method, the frequency bands of the 5- and 2.4-GHz bands can be used.

If, for example, the MFP 300 executes the WLAN P2P method, and only the 2.4-GHz band is activated, even if the search-side apparatus such as the communication terminal apparatus 200 transmits a search command in the 5-GHz band, the MFP 300 does not respond to it. If the MFP 300 activates only BT communication (only the 2.4-GHz band is usable), even if the search-side apparatus such as the communication terminal apparatus 200 transmits a search command in the 2.4- or 5-GHz band by WLAN communication, the MFP 300 does not respond to it. Note that examples of the P2P method are the following four modes.

mode A (software AP mode)
mode B (Wi-Fi Direct (WFD) mode)
mode D (Bluetooth Low Energy (BLE) mode)
mode E (Bluetooth Classic (BT Classic) mode)

In the software AP mode or the WFD mode, the MFP 300 functions as a master station and the communication terminal apparatus 200 as the communication partner functions as a slave station. More specifically, in the software AP mode, the MFP 300 functions as a master station by executing the access point function. Then, when the communication terminal apparatus 200 serves as a slave station to be connected to the MFP 300, it plays the role of a client that requests various services. In the WFD mode, the MFP 300 functions as a master station by functioning as a WFD Group Owner. Then, when the communication terminal apparatus 200 serves as a slave station to be connected to the MFP 300, it plays the role of a WFD client that requests various services.

Furthermore, in the BLE mode or the BT Classic mode, the MFP 300 functions as a slave and the communication terminal apparatus 200 functions as a master. Note that "Bluetooth Classic" indicating the BT Classic mode indicates BT of the standard before BLE standard (Bluetooth 4.0).

There are apparatuses that are compatible and incompatible with each of the four modes, and applications may be different for the respective modes. Wireless apparatus search sequences in the respective modes will be described below with reference to FIGS. 7, 8, 10, and 11. Note that an apparatus having a communication function by Wi-Fi Direct® or Bluetooth calls, from its operation unit, a dedicated application for implementing the communication function. Then, the Wi-Fi Direct apparatus or Bluetooth apparatus can execute Wi-Fi Direct communication or Bluetooth (BT) communication based on an operation on a UI (User Interface) screen provided by the application.

In the following description, for the sake of convenience, the P2P method including the software AP mode and the WFD mode will be referred to as the "P2P mode" hereinafter and the P2P method using BT including the BLE mode and the BT Classic mode will be referred to as the "BT mode".

Apparatus Search Sequence in Software AP Mode

Figure 7:
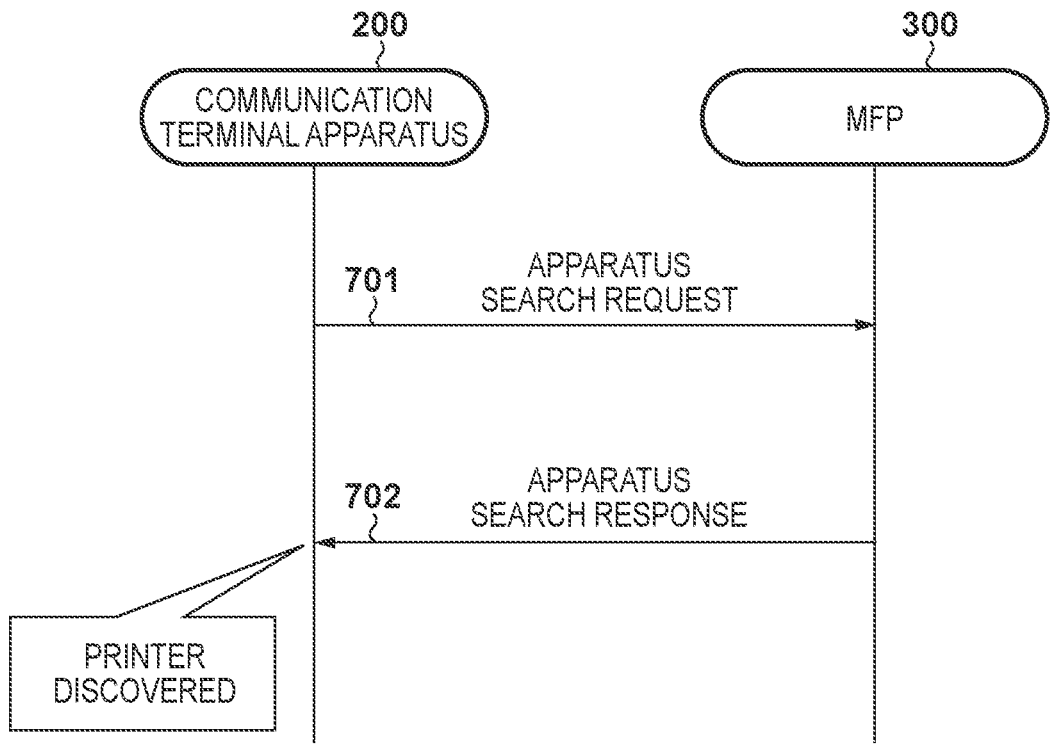
FIG. 7 is a sequence chart showing a wireless apparatus search sequence in mode A (software AP mode)

FIG. 7 is a sequence chart showing the wireless apparatus search sequence in mode A (software AP mode). In the software AP mode, the apparatus (for example, the communication terminal apparatus 200) for performing communication serves as a client that plays the role of requesting various services. Another apparatus serves as an AP (for example, the MFP 300) that implements the access point function in the WLAN by software settings.

In the software AP mode, the client searches for an apparatus to serve as a software AP by an apparatus search request 701. Upon receiving the apparatus search request 701, the software AP returns an apparatus search response 702. With this exchange operation, the client discovers the MFP 300 serving as the software AP. Note that as commands and parameters transmitted/received when implementing wireless connection between the client and the software AP, commands and parameters defined by the Wi-Fi standard are used, and a description thereof will be omitted.

Apparatus Search Sequence in WFD Mode

Figure 8:
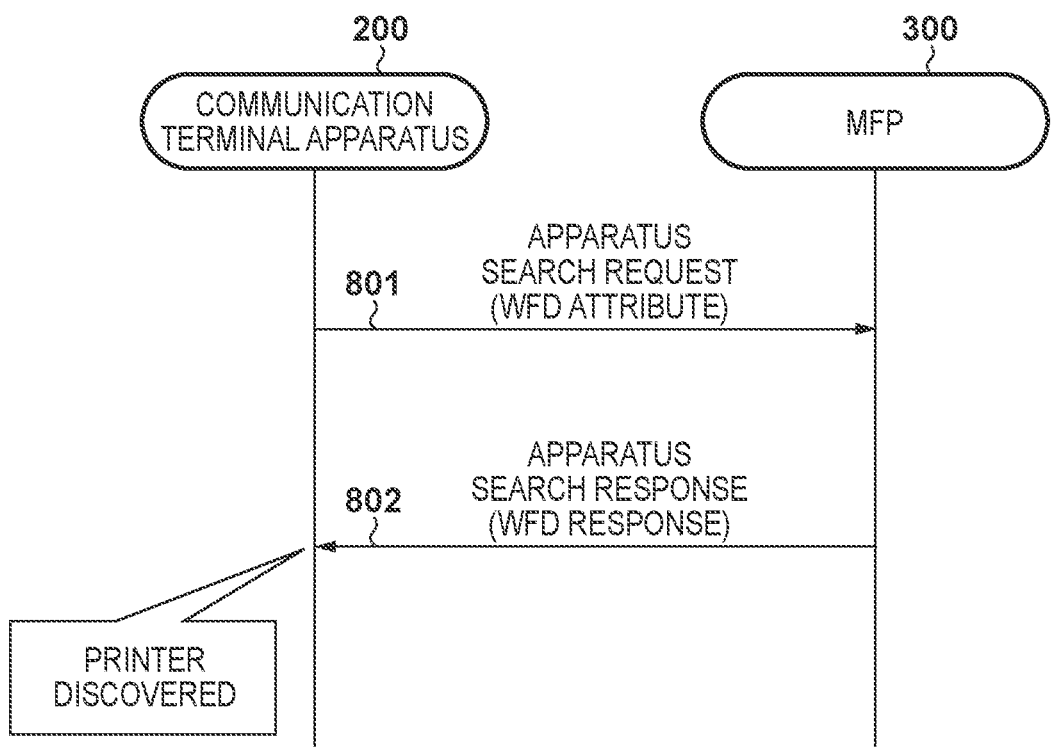
FIG. 8 is a sequence chart showing a wireless apparatus search sequence in mode B (WFD mode)

FIG. 8 is a sequence chart showing the wireless apparatus search sequence in mode B (WFD mode). In the WFD mode, an apparatus serving as a communication partner is searched for by an apparatus search request 801. The apparatus search request 801 has a WFD attribute, and can specify that a search target is a communication apparatus in the WFD mode. Upon receiving the apparatus search request 801 transmitted from the client (communication terminal apparatus 200), the MFP 300 returns an apparatus search response 802. Then, the client detects the MFP 300 as a P2P communication partner. After the roles of a P2P group owner and P2P client are determined, the remaining wireless connection processing is performed. The role determination processing corresponds to, for example, GO Negotiation in P2P. If, however, the frequency band when the wireless infrastructure mode and the WFD mode operate concurrently is restricted by a wireless chip set, it is necessary to match channels in the two modes. Therefore, the MFP 300 is desirably, fixedly activated as the master station (Autonomous Group Owner) in the WFD mode. In this case, communication of GO Negotiation is unnecessary to determine the roles. Since the MFP 300 serves as a master station to determine a frequency band and a channel, it can select and use the 5- or 2.4-GHz frequency band and a channel. The P2P mode like the software AP mode and the WFD mode will sometimes be referred to as the second wireless interface or the second communication mode hereinafter in this embodiment.

Apparatus Search Sequence in BLE Mode

Figure 10:
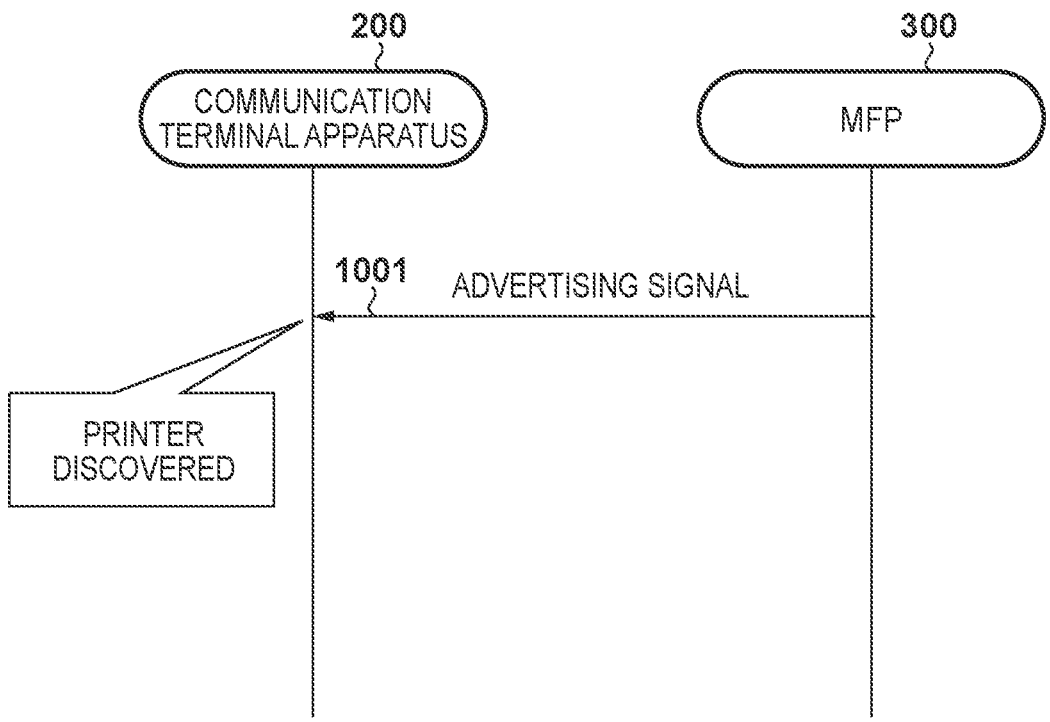
FIG. 10 is a sequence chart showing a wireless apparatus search sequence in mode D (BLE mode)

FIG. 10 is a sequence chart showing the wireless apparatus search sequence in mode D (BLE mode). In the BLE mode, an apparatus outputs an advertising signal 1001 to notify a communication partner apparatus of the existence of itself. For example, the MFP 300 functions as a peripheral that outputs the advertising signal 1001. Upon receiving the advertising signal 1001, the apparatus (for example, the communication terminal apparatus 200) functions as a central apparatus that exchanges data to be connected to the MFP 300 by P2P after receiving the advertising signal 1001. After the central apparatus issues a connection request to the peripheral, the MFP 300 transitions from the peripheral function to the salve function, and the communication terminal apparatus 200 transitions from the central function to the master function. Note that as commands and parameters used to exchange data for connection, commands and parameters defined by the BT 4.1 standard or the like are used, and a description thereof will be omitted.

Apparatus Search Sequence in BT Classic Mode

Figure 11:
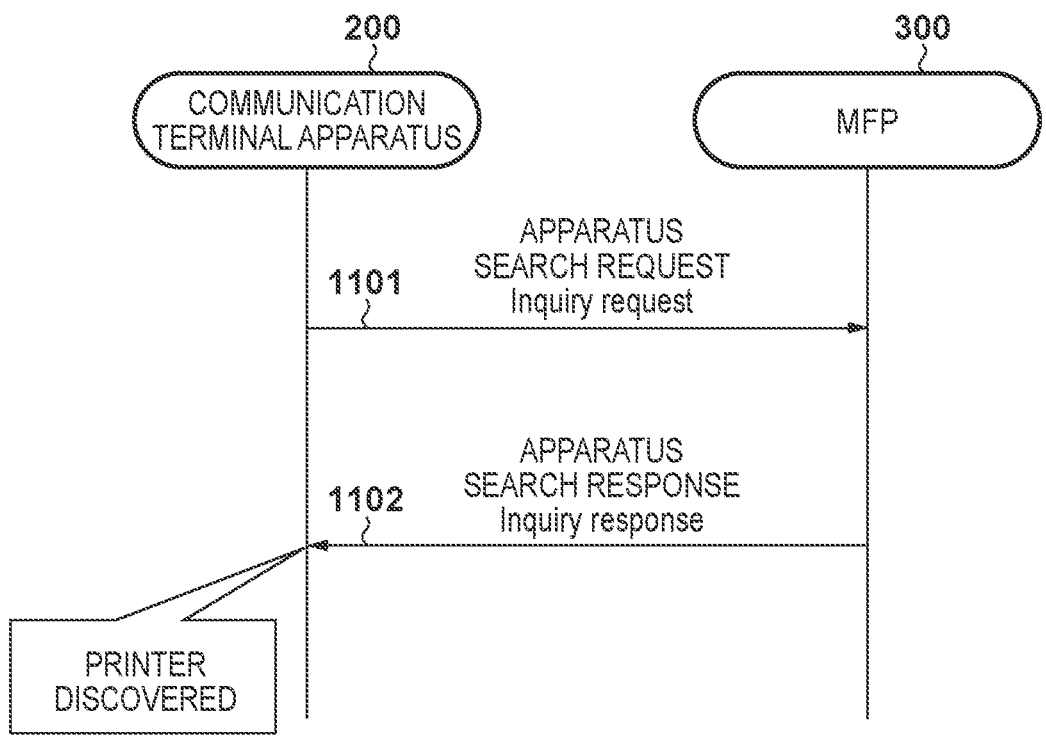
FIG. 11 is a sequence chart showing a wireless apparatus search sequence in mode E (BT mode)

FIG. 11 is a sequence chart showing the wireless apparatus search sequence in mode E (BT Classic mode). In the BT Classic mode, an apparatus (for example, the communication terminal apparatus 200) for performing communication serves as a master that searches for a BT apparatus. Another apparatus serves as a slave in BT.

An apparatus as a communication partner is searched for by an apparatus search request 1101 of the master. Upon receiving the apparatus search request, the apparatus (for example, the MFP 300) returns an apparatus search response 1102. Connection or transmission/reception is performed by commands and parameters including the apparatus search request 1101 and the apparatus search response 1102 and defined by BT 1.1 and its various standards, and a description thereof will be omitted. The P2P method using BT like the BLE mode and the BT Classic mode will sometimes be referred to as the third wireless interface or the third communication mode hereinafter in this embodiment.

<Wireless Infrastructure Mode>

Figure 9:
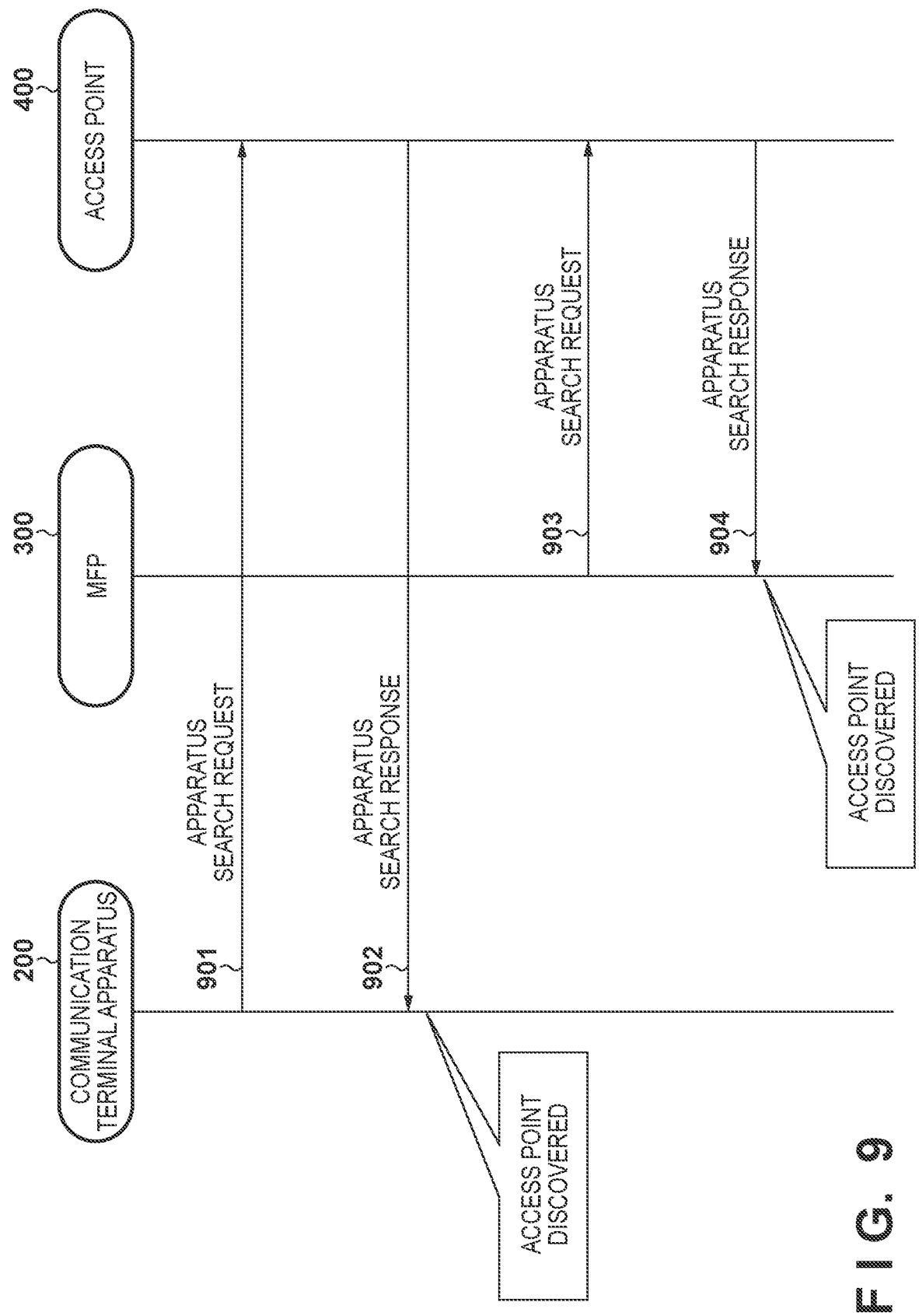
FIG. 9 is a sequence chart showing a wireless apparatus search sequence in mode C (wireless infrastructure mode)

FIG. 9 is a sequence chart showing a wireless apparatus search sequence in mode C (wireless infrastructure mode). In the wireless infrastructure mode, apparatuses (for example, the mobile communication terminal apparatus 200 and the MFP 300) which communicate with each other are connected to an external "access point" (for example, the access point 400) that controls a network and communicate with each other via the external access point. In other words, the wireless infrastructure mode is a mode in which the external access point functions as a master station and apparatuses as slave stations communicate with each other via a network created by the external access point. In the wireless infrastructure mode, the communication terminal apparatus 200 searches for the access point 400 by an apparatus search request 901. When the access point 400 returns an apparatus search response 902, the access point 400 is discovered. Similarly, the MFP 300 searches for the access point 400 by an apparatus search request 903. When the access point 400 returns an apparatus search response 904, the access point 400 is discovered. When each of the communication terminal apparatus 200 and the MFP 300 discovers the access point 400, connection is performed. After connection, as commands and parameters transmitted/received by communication between the apparatuses via the access point 400, commands and parameters defined by the Wi-Fi standard are used. Thus, a description thereof will be omitted. The wireless infrastructure mode will sometimes be referred to as the first wireless interface or the first communication mode hereinafter in this embodiment.

<Restrictions on Frequency Band and Setup Method>

A method of using wireless communication without impairing user convenience even if restrictions are imposed on the function and performance when a plurality wireless interfaces can operate concurrently in one wireless communication device will be described. Note that prior to the following description, restrictions as the premise of this embodiment will be explained.

Since, for example, "only one CPU and one antenna can be adopted to be used in the wireless chip set" or "firmware becomes complicated when the plurality of wireless interfaces are made to operate concurrently", restrictions may be imposed on the use of wireless communication. That is, if the plurality of communication modes operate concurrently in one apparatus, the restrictions on the wireless chip set may limit the communication speed and the like.

As the first restriction, if a plurality of wireless interfaces complying with a plurality of wireless communication standards operate concurrently, the number of frequency bands (use frequency bands) to be used is limited. This is caused by a case in which the wireless combo unit 616 used operates by one CPU and one antenna, and thus up to two channels can be used concurrently to satisfy necessary throughput. Note that the necessary throughput is set in accordance with the specifications of the product in consideration of a speed required by the user. As a result of examinations by the present inventors, in the case of the wireless combo unit operating by one CPU and one antenna, it may be possible to wait for communications of up to only two channels in order to satisfy the conventional throughput, and thus this restriction will be explained as the first restriction in the following description.

That is, if the first restriction is imposed on the wireless chip set, the communication interval and the communication speed may be limited depending on the setting (for example, a single interface/a plurality of interfaces) state of each wireless interface. Stable communication and concurrent use of the plurality of interfaces have a tradeoff relationship. Therefore, in this embodiment, by avoiding the restriction by control in the wireless communication device, it is possible to use wireless communication without impairing the user convenience of the wireless communication device.

In this embodiment, to avoid the first restriction, control is executed to switch one of the communication modes to the inactive setting when the plurality of wireless interfaces complying with the plurality of wireless communication standards operate.

As the second restriction, if the apparatus (for example, the MFP 300) including the plurality of wireless interfaces uses the use band of a radar wave designated by a weather radar or the like in the 5-GHz band, it is necessary to execute a DFS (Dynamic Frequency Selection) function. In this case, if the apparatus operates as a wireless base station in the band in which the DFS function is necessary, it is necessary to always monitor and detect the use band of the radar wave designated by the weather radar and to immediately move a channel if the use band is detected. That is, if the MFP 300 operates as a master station in the P2P mode and uses the use band of the radar wave designated by the weather radar or the like, it is necessary to periodically monitor the band of the radar wave by the DFS function, thereby imposing a processing load.

Therefore, in this embodiment, to avoid the second restriction, control is executed not to use, in the P2P mode, the band in which the DFS function is necessary. In this embodiment, in control of switching the active (ON)/inactive (OFF) setting of the communication mode, control is executed to perform switching in accordance with a combination of frequency bands used by the respective wireless interfaces of the apparatus (for example, the MFP 300) including the plurality of wireless interfaces.

Note that, for example, in Japan, the W52 band (5.2-GHz band (5150 to 5250 MHz)), W53 band (5.3-GHz band (5250 to 5350 MHz)), and W56 band (5.6-GHz band (5470-5725 MHz)) are defined as usable bands in the 5-GHz band. Among them, the W53 band (5.3-GHz band (5250 to 5350 MHz)) and W56 band (5.6-GHz band (5470-5725 MHz)) are bands in which the DFS function is necessary. The W52 band is a band in which the DFS function is unnecessary. In the following description, a band in which the DFS function is necessary will sometimes be referred to as a DFS band hereinafter and a band in which the DFS function is unnecessary will sometimes be referred to as a non-DFS band hereinafter.

Control of switching the active/inactive setting of each communication mode in accordance with the operation state is caused by an initial setup, switching of the active/inactive setting of the interface by LAN settings, a manual setup for wireless communication, an automatic setup for wireless communication, a change of the channel of the wireless infrastructure mode, or the like. Details of control of switching the active/inactive setting of each communication mode will be described below. Note that in the following description, the BLE mode will be exemplified as a description of the BT mode but the BT Classic mode is also applicable in this embodiment.

<Initial Setup>

The MFP 300 is configured to activate a processing sequence (initial setup) dedicated for initial activation, that is different from a normal processing sequence, when the user who has purchased the main body powers it on for the first time, in order to make initial settings in a factory shipping state (arrival state).

For example, the MFP 300 is shipped from a factory in a state in which no ink tank or printhead is attached to the printing unit 612. Therefore, it is necessary to prepare the MFP 300 to be usable by, for example, prompting the user to perform a work of attaching the ink tank and printhead packaged together immediately after initial activation operated by the user for the first time.

Whether the current state is an initial activation state representing the factory shipping state is controlled using a flag (initial activation flag) saved in the nonvolatile memory 605. Upon completion of preparation of the MFP 300 to be used by the user, the state of the initial activation flag is changed, and the processing sequence dedicated for initial activation is configured not to be activated thereafter. This embodiment pays attention to the fact that the specific processing is performed in the MFP 300 at the time of initial activation, and includes setting of each wireless interface in the processing performed at the time of initial activation.

Figure 12:
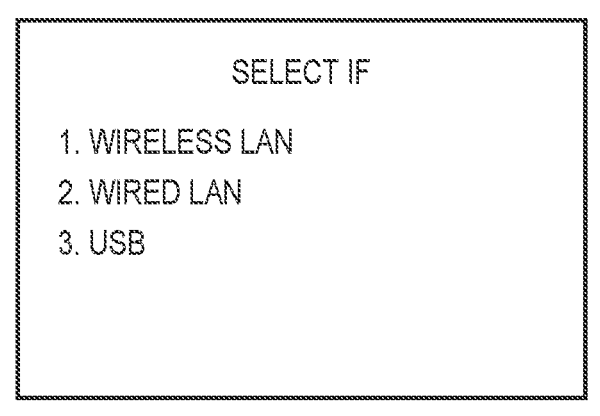
Figure 13:
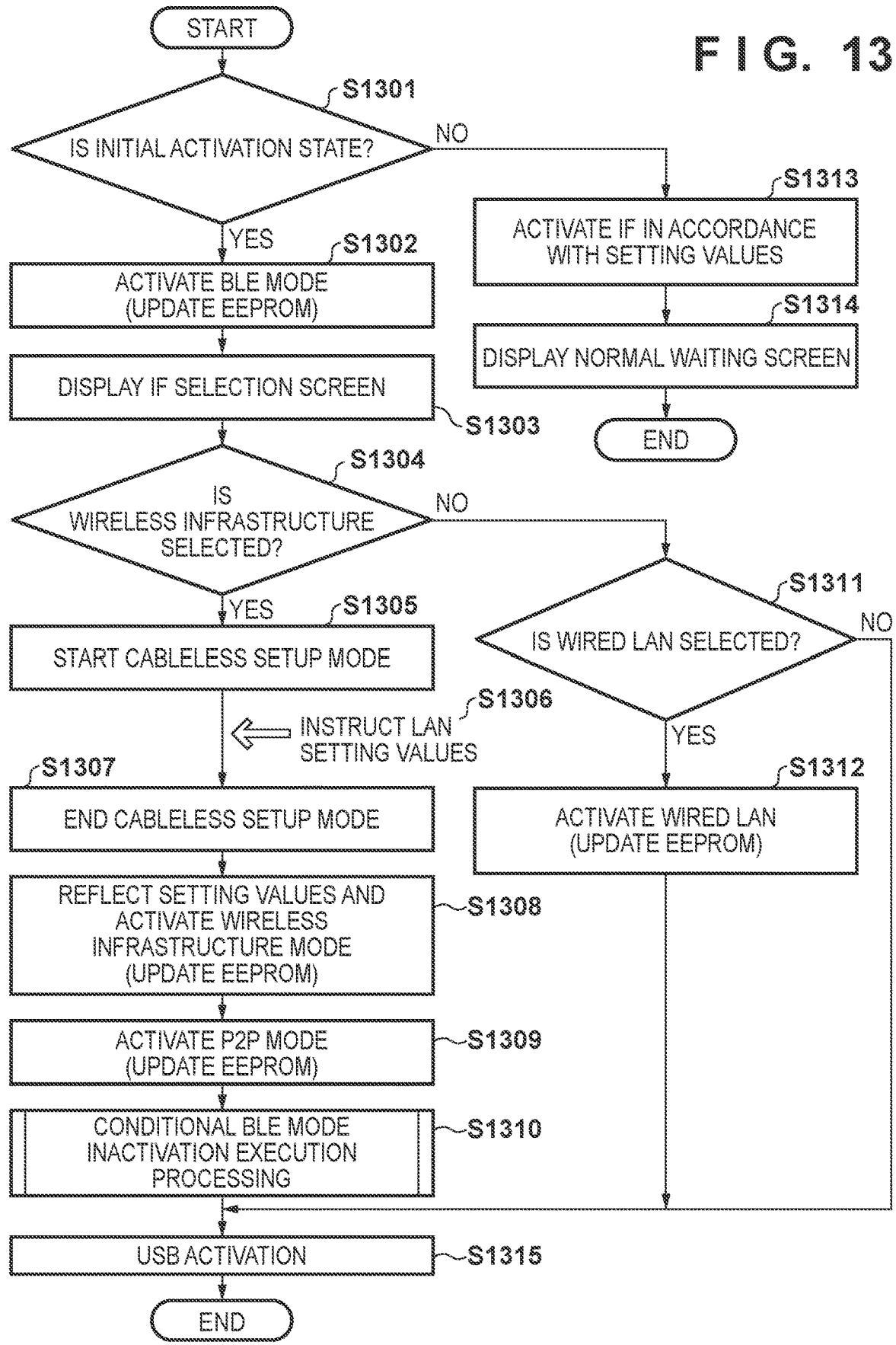
FIG. 13 is a flowchart illustrating interface processing at the time of initial activation.

An interface processing sequence performed at the time of initial activation of the MFP 300 will be described with reference to FIGS. 12 and 13. Note that an initial setup sequence other than the interface setting is processed at the time of initial activation. However, a sequence that is not directly relevant to this embodiment is not illustrated here.

In step S1301, upon power-on, the CPU 602 determines, by referring to the initial activation flag saved in the nonvolatile memory 605, whether the initial activation flag indicates "initial activation state". If, as a result of the determination processing, the initial activation flag indicates "initial activation state", the process advances to step S1302; otherwise, the process advances to step S1313. The initial activation flag is preset to a specific value (for example, a value indicating "initial activation state") at the time of factory shipment of the MFP 300.

Figure 15:
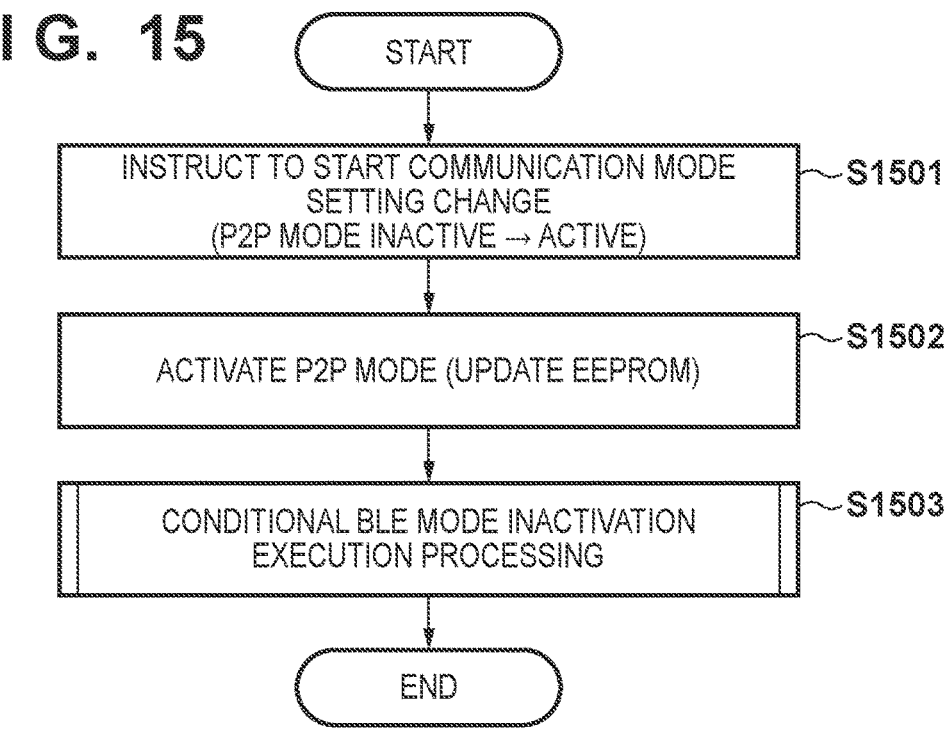
FIG. 15 is a flowchart illustrating switching of the P2P mode (WFD or software AP mode or the like) from an inactive setting to an active setting.
Figure 17:
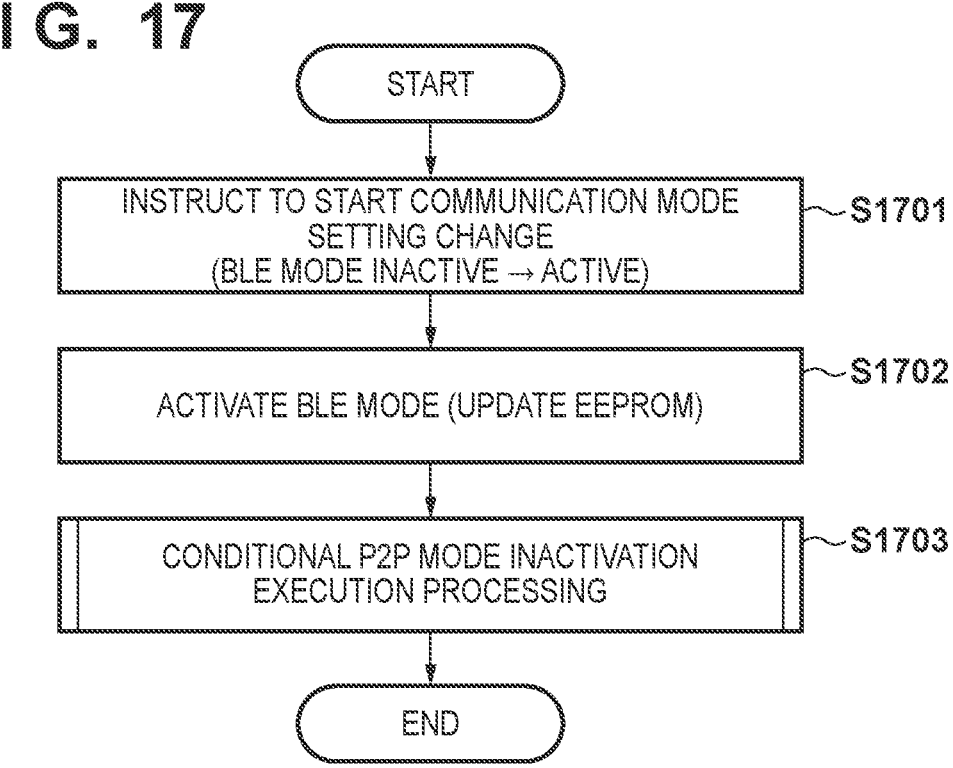
FIG. 17 is a flowchart illustrating switching of the BLE mode from an inactive setting to an active setting.
Figure 19:
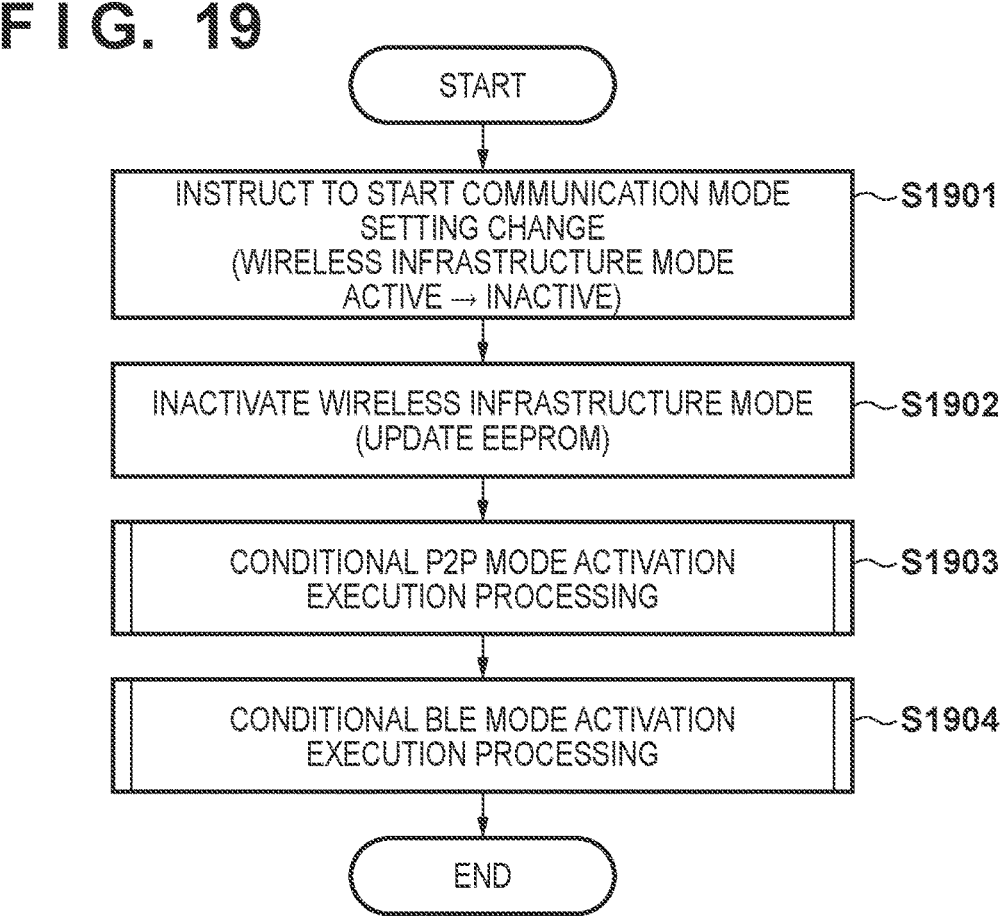
FIG. 19 is a flowchart illustrating switching of the wireless infrastructure mode from the active setting to the inactive setting.

In step S1313, the CPU 602 activates an interface in accordance with "active/inactive setting of interface" saved in the nonvolatile memory 605. In activating the interface, processes in steps S1901 to S1903 of FIG. 19 are executed, processes in steps S1701 to S1703 of FIG. 17 are executed, and then processes in steps S1501 to S1503 of FIG. 15 are executed.

In step S1314, the CPU 602 displays the home screen exemplified in FIG. 4A on the screen of the operation display unit 305, and accepts an operation input from the user. Steps S1313 and S1314 indicate a sequence corresponding to activation processing at the time of normal use by the user. On the other hand, steps S1302 to S1312 and S1315 indicate a processing sequence when the user activates the MFP 300 for the first time.

In step S1302, the CPU 602 activates (turns on) the BLE mode (as the BLE mode is activated, the setting is saved (updated) in the nonvolatile memory 605).

In step S1303, the CPU 602 displays the communication setting screen exemplified in FIG. 4C on the screen of the operation display unit 305. When the communication setting screen is displayed, the user selects, from items displayed on the screen, an interface to be used.

In step S1304, the CPU 602 determines whether the wireless LAN has been selected by a user operation on the communication setting screen. If, as a result of the determination processing, no wireless LAN has been selected, the process advances to step S1311; otherwise, the process advances to step S1305.

In step S1311, the CPU 602 determines whether the wired LAN has been selected by the user operation on the communication setting screen. If, as a result of the determination processing, no wired LAN has been selected, the process advances to step S1315; otherwise, the process advances to step S1312. A case in which the process advances to step S1315 corresponds to a case in which neither the wireless LAN nor the wired LAN has been selected and BLE and USB have been selected.

In step S1315, the CPU 602 activates USB, thereby ending the interface setting processing at the time of initial activation. Note that although not shown, if an arrival processing sequence including interface selection ends, the CPU 602 changes the value of the initial activation flag saved in the nonvolatile memory 605 from the initial activation state to a non-initial activation state. This prevents the initial activation processing sequence from being activated thereafter.

In step S1312, the CPU 602 activates the wired LAN (as the wired LAN is activated, the setting is saved in the nonvolatile memory 605, and is referred to as an interface to be activated at the time of normal activation).

In step S1305, the CPU 602 activates a cableless setup mode. The cableless setup mode is a dedicated mode in which the wireless infrastructure mode can be set without using a cable. In the cableless setup mode, the MFP 300 is activated in the software AP mode. Thus, an external apparatus such as a personal computer, smartphone, or tablet can readily be connected directly, as a client (slave device), to the MFP 300, and can communicate with the MFP 300. The 2.4-GHz band is used at the time of a cableless setup. However, the non-DFS band in the 5-GHz band can also be used. Note that in the cableless setup mode, not only the software AP mode but also the WFD mode can be used. In the WFD mode, however, it is necessary to include a character string of a randomly generated value in an SSID as a wireless parameter in terms of the standard specification, and the software AP mode is more desirable for a cableless setup in which a preserved SSID is used. Even the user who hardly has knowledge of the LAN can readily perform connection to the MFP 300 by a LAN setting-specific application that operates on the external apparatus such as a personal computer, smartphone, or tablet. Information necessary to specify an access point or security information for connection is sent to the MFP 300 as the software AP by the LAN setting-specific application without knowing details of setting contents.

In the cableless setup mode, in step S1306, the CPU 602 accepts settings mainly necessary for connection in the wireless infrastructure mode. The external apparatus such as a personal computer, smartphone, or tablet is connected to the MFP 300, and then transmits setting information (wireless setting information) of the wireless infrastructure mode to the MFP 300 by the application. Thus, the CPU 602 receives the wireless setting information, and obtains it in the RAM 604 or the like. The wireless setting information includes the SSID of an external access point forming a network which the user wants to join, information (information indicating one of the 5- and 2.4-GHz bands) of a frequency band used by the external access point, an encryption method, and an authentication method. Note that the information of the frequency band obtained as the wireless setting information may be a wireless channel value related to the frequency band. Upon receiving the wireless setting information, the MFP 300 stops the software AP mode, and executes the wireless setting processing of the wireless infrastructure mode.

Upon receiving the wireless setting information in step S1306, the CPU 602 ends the cableless setup mode in step S1307. In step S1308, in accordance with the wireless setting information received in step S1306, the CPU 602 activates communication in the wireless infrastructure mode, and performs connection processing to the external access point 400. Then, as the wireless infrastructure mode is activated, the CPU 602 saves the setting in the nonvolatile memory 605.

In step S1309, the CPU 602 activates the P2P mode, and saves the setting in the nonvolatile memory 605. When activating the P2P mode and activating the MFP 300 as the master station in the P2P mode, it is possible to transmit a beacon and detect it from the communication terminal apparatus 200 on the host side.

Note that the wireless infrastructure mode and the P2P mode can operate concurrently in the MFP 300 according to this embodiment, and if the user selects only the wireless infrastructure mode in a setup sequence at the time of initial activation, the MFP 300 also activates the P2P mode based on its own judgement. In this way, the wireless infrastructure mode and the P2P mode are automatically set up in the active state. That is, processing of activating the P2P mode and saving the setting is performed regardless of whether the settings for activating the P2P mode have been received.

Note that if the wireless infrastructure mode and the P2P mode operate concurrently, the frequency band (use channel) set in the P2P mode is different between a case in which the use frequency band in the wireless infrastructure mode is the DFS band and other cases (the frequency band is the 2.4-GHz band or the non-DFS band in the 5-GHz band). That is, if the use frequency band in the wireless infrastructure mode is the DFS band, one of the 2.4-GHz band and the non-DFS band in the 5-GHz band is set as the frequency band in the P2P mode. On the other hand, if the use frequency band in the wireless infrastructure mode is the 2.4-GHz band or the non-DFS band in the 5-GHz band, the same band (the same channel) as the use frequency band in the wireless infrastructure mode can be set as the frequency band in the P2P mode.

In step S1310, the CPU 602 executes processes in steps S2401 to S2407 of FIG. 24. Processing according to the flowchart shown in FIG. 24 indicates conditional BLE mode inactivation execution processing. The conditional BLE mode inactivation execution processing is processing of determining whether to make communication in the BLE mode executable, when switching the P2P mode to the active setting in a state in which the wireless infrastructure mode and the BLE mode are active, and switching, in accordance with a result of the determination processing, whether to make communication in the BLE mode executable.

In step S2401, the CPU 602 determines whether the setting of the wireless infrastructure mode is the active setting. If, as a result of the determination processing, it is determined that the wireless infrastructure mode is not active, the process advances to step S2407; otherwise, the process advances to step S2402.

In step S2407, the CPU 602 saves, in the nonvolatile memory 605, setting of a P2P mode priority setting in a communication mode priority setting in which the P2P mode priority setting or a BLE mode priority setting can be set.

In step S2402, the CPU 602 determines whether the BLE mode is active. If, as a result of the determination processing, it is determined that the BLE mode is not active, the process advances to step S2407; otherwise, the process advances to step S2403.

In step S2403, the CPU 602 determines whether connection to the external access point has been performed using the DFS use band (DFS band) in the 5-GHz band. If, as a result of the determination processing, it is determined that connection to the external access point has been performed using the DFS use band in the 5-GHz band, the process advances to step S2404; otherwise, the process advances to step S2406.

In step S2406, the CPU 602 determines whether the channel used in the wireless infrastructure mode is the same as that used in the P2P mode. That is, it is determined whether the frequency band used in the wireless infrastructure mode is the same as that used in the P2P mode. If, as a result of the determination processing, it is determined that the channel used in the wireless infrastructure mode is the same as that used in the P2P mode, the process advances to step S2407; otherwise, the process advances to step S2404.

In step S2404, the CPU 602 displays a notification (image or characters) representing a warning on the screen of the operation display unit 305. The notification representing the warning is a notification for notifying the user that the BLE mode is to be stopped. In step S2405, the CPU 602 controls to disable execution of communication in the BLE mode. More specifically, the CPU 602 disables device detection/discovering/data transmission/reception in the BLE mode, and causes the apparatus to transition to a state in which no antenna is used in the BLE mode. Alternatively, to set the inactive setting of the BLE mode, the CPU 602 may save a setting value indicating the inactive setting in the nonvolatile memory 605.

Note that in the above-described procedure, after sending the notification of the warning in step S2404, it is desirable to stop communication in the BLE mode in step S2405. However, in this embodiment, step S2405 may be executed by skipping step S2404. That is, processing of controlling to disable execution of communication in the BLE mode may be executed without displaying the notification representing the warning in step S2404.

After that, in either of the case in which the wired LAN is selected and the case in which the wireless LAN is selected, the USB interface is activated in step S1315, thereby ending the interface setting processing at the time of initial activation.

If the user operates the operation display unit 305 to select the WLAN at the time of initial activation, the MFP may be connected to the external access point without using the DFS band in the 5-GHz band in the wireless infrastructure mode, and the wireless infrastructure mode and the P2P mode may operate using the same channel. That is, the MFP may be connected to the external access point using the 2.4-GHz band or the non-DFS band in the 5-GHz band in the wireless infrastructure mode, and the wireless infrastructure mode and the P2P mode may operate using the same channel. In this case, in the processing procedure, concurrent communication by three interfaces of communication in the wireless infrastructure mode, communication in the P2P mode, and communication in the BLE mode can be executed.

Furthermore, the MFP may be connected to the external access point using the DFS use band in the 5-GHz band, or the wireless infrastructure mode and the P2P mode may not operate using the same channel. In this case, in the processing procedure, concurrent communication by two interfaces of communication in the wireless infrastructure mode and communication in the P2P mode can be executed and communication in the BLE mode cannot be executed.

This allows control considering the above-described two restrictions. That is, if the DFS band is set as the use frequency band in the wireless infrastructure mode, the MFP 300 according to this embodiment controls not to use the DFS band in the P2P mode in consideration of the second restriction. That is, the wireless infrastructure mode and the P2P mode use different frequency bands (channels). In this case, since two channels are used in the wireless infrastructure mode and the P2P mode, the MFP 300 controls to disable execution of communication in the BLE mode in consideration of the first restriction.

On the other hand, if one of the 2.4-GHz band and the non-DFS band in the 5-GHz band is set as the use frequency band in the wireless infrastructure mode, the MFP 300 according to this embodiment can set, as the use frequency band, in the P2P mode, the same frequency band (channel) as that in the wireless infrastructure mode. In this case, since one usable channel remains, the channel can be used for communication in the BLE mode.

As described above, in this embodiment, even if a plurality of communication modes are executed, it is possible to maintain necessary throughput. Settings considering the above-described two restrictions can be made at the time of the initial setup for starting the use of the MFP.

Note that in the above-described example, if the DFS band is set as the use frequency band in the wireless infrastructure mode, control is executed to disable execution of communication in the BLE mode. As described above, the reason why the P2P mode is prioritized over the BLE mode is that the user who performs a cableless setup often activates (turns on) the Wi-Fi setting of the communication terminal apparatus 200 and uses the P2P mode with a probability higher than that of the BLE mode. However, this embodiment is not limited to this. That is, control may be executed to disable execution of communication in the P2P mode instead of the BLE mode. More specifically, if the DFS band is set as the use frequency band in the wireless infrastructure mode, control may be executed to disable communication in the P2P mode.

In the above-described example, the processing is switched in accordance with whether the DFS band is set as the use frequency band in the wireless infrastructure mode.

However, this embodiment is not limited to this. In the above-described example, in step S2403 of FIG. 24, the CPU 602 determines whether connection to the external access point has been performed using the DFS band, and then switches the next step. However, in this embodiment, the CPU 602 may determine in step S2403 whether connection to the external access point has been performed using the 5-GHz band, and then switch the next step. That is, the processing may be switched in accordance with not whether the DFS band is used in the wireless infrastructure mode but whether the 5- or 2.4-GHz band is used in the wireless infrastructure mode. More specifically, if the 5-GHz band is used as the use frequency band in the wireless infrastructure mode, the MFP 300 uses the 2.4-GHz frequency band in the P2P mode, and controls to disable execution of the BLE mode. On the other hand, if the 2.4-GHz band is set as the use frequency band in the wireless infrastructure mode, the MFP 300 sets, as the use frequency band, in the P2P mode, the same frequency band (channel) as that in the wireless infrastructure mode, and sets the one remaining channel for the BLE mode. As described above, the MFP 300 can simplify the processing by making a setting so any band in the 5-GHz band is not used in the P2P mode.

<Switching of Active/Inactive Setting of Interface by LAN Settings>

A method of switching the active/inactive setting of each of the communication modes of the wireless infrastructure mode/P2P mode/BLE mode at the time of switching the active/inactive setting of the interface will be described next. The operation display unit 305 is configured to set, via the cableless setup or the communication setting screen shown in FIG. 4C, the active/inactive setting of the interface to be used. Note that the BLE mode will be exemplified as a description of the BT mode but the BT Classic mode is also applicable in this embodiment.

In this embodiment, the specifications of the wired LAN and the wireless LAN are exclusive. While the wired LAN is active, the wireless LAN cannot be activated at the same time. Conversely, while the wireless LAN is active, the wired LAN cannot be activated at the same time. It is possible to inactivate the wired LAN and the wireless LAN concurrently. Since the Bluetooth setting is incorporated as an interface in the wireless combo unit 616 together with the wireless LAN, it is exclusive with respect to the wired LAN, similar to the wireless LAN. The BLE mode is described as Bluetooth but another Bluetooth standard is possible. Although the USB interface cannot be inactivated by the user setting, the USB interface can always be activated at the time of activation, and can be used concurrently with one of the wired LAN, the wireless LAN, and BLE.

The wireless LAN settings include the P2P mode setting and the wireless infrastructure mode setting, and each mode can be activated/inactivated individually. It is possible to activate the P2P mode and the wireless infrastructure mode concurrently. The BLE mode can be activated/inactivated independently of the P2P mode and the wireless infrastructure. At this time, the BLE mode can be activated concurrently with the P2P mode and the wireless infrastructure mode. The MFP 300 can then perform P2P communication, wireless infrastructure communication, and BLE communication concurrently.

However, when the plurality of wireless communication modes operate concurrently, there are the above-described two restrictions. That is, there are the first restriction that the number of channels to be used is limited and the second restriction that when the DFS function is used in the P2P mode, the processing load may increase. Therefore, settings are made in accordance with the restrictions by switching the active/inactive setting of each communication mode.

The active/inactive state of each communication mode and the communication mode priority setting are saved in the nonvolatile memory 605, and each interface is activated based on the saved information with reference to it at the time of next activation. When initializing the LAN setting items of the main body, the P2P mode and the wireless infrastructure mode are inactivated, the BLE mode is activated, and the P2P mode priority setting is set in the communication mode priority setting. Furthermore, the wired LAN is also inactivated and the wired and wireless LANs are set in an unused state. The user who has initialized the LAN settings can individually change the setting of a desired interface to the active setting and use the interface.

Communication mode settings will be described with reference to FIG. 14. FIG. 14 is a table showing an example of the structure of a table showing settable combinations of communication modes and frequency bands. In the table shown in FIG. 14, there are seven combinations of communication mode settings. However, if the setting of a frequency band to be used is additionally combined, 15 combinations of communication mode settings 1 to 15 are possible. Note that in FIG. 14, "active" indicates a state in which communication in the target communication mode is executable. More specifically, "active" indicates a state in which a setting value representing that the communication mode is active is saved in the nonvolatile memory 605 and the antenna is usable in the communication mode. On the other hand, "inactive" in FIG. 14 indicates a state in which communication in the target communication mode is not executable. More specifically, "inactive" indicates a state in which a setting value representing that the communication mode is inactive is saved in the nonvolatile memory 605. Alternatively, "inactive" indicates a state in which a setting value representing that the communication mode is active is saved in the nonvolatile memory 605 but the antenna is not usable in the communication mode.

Activation of P2P Mode

An example of a pattern in which the restrictions on the wireless chip set become a barrier to switching of the interface is switching from communication mode setting 3 in FIG. 14 to another communication mode setting. In the state of communication mode setting 3 in FIG. 14, connection to the external access point has been performed using the DFS use band in the 5-GHz band in the wireless infrastructure mode and the BLE mode is active. In this state, if the user switches the P2P mode from the inactive setting to the active setting on the communication setting screen shown in FIG. 4C, the first and second restrictions on the wireless chip set become a barrier. That is, under the first restriction, the channels in the wireless infrastructure mode and the P2P mode need to match each other in order to operate the three communication modes concurrently. However, under the second restriction, control is executed not to use the DFS function in the P2P mode. Thus, if connection to the external access point has been performed using the DFS use band in the 5-GHz band in the wireless infrastructure mode, the channels in the wireless infrastructure mode and the P2P mode are different from each other. Therefore, if the three communication modes operate concurrently, the communication speed may be limited and the throughput may deteriorate. FIG. 15 shows a flowchart of the process of switching the communication mode setting to communication mode setting 14 in FIG. 14 in which the P2P mode can be used while avoiding the restrictions.

In step S1501, upon receiving a user operation (a user operation of switching the P2P mode from the inactive setting to the active setting) on the communication setting screen shown in FIG. 4C, the CPU 602 switches the P2P mode from the inactive setting to the active setting.

In step S1502, the CPU 602 activates the P2P setting and saves the setting in the nonvolatile memory 605. In step S1503, the CPU 602 executes the conditional BLE mode inactivation execution processing as indicated in steps S2401 to S2407 in the description of the initial setup.

This processing can start communication in the P2P mode while satisfying both the first and second restrictions when the P2P mode is activated in a state in which the wireless interfaces of the wireless infrastructure mode and the BLE mode operate concurrently.

Activation of Wireless Infrastructure Mode

Figure 16:
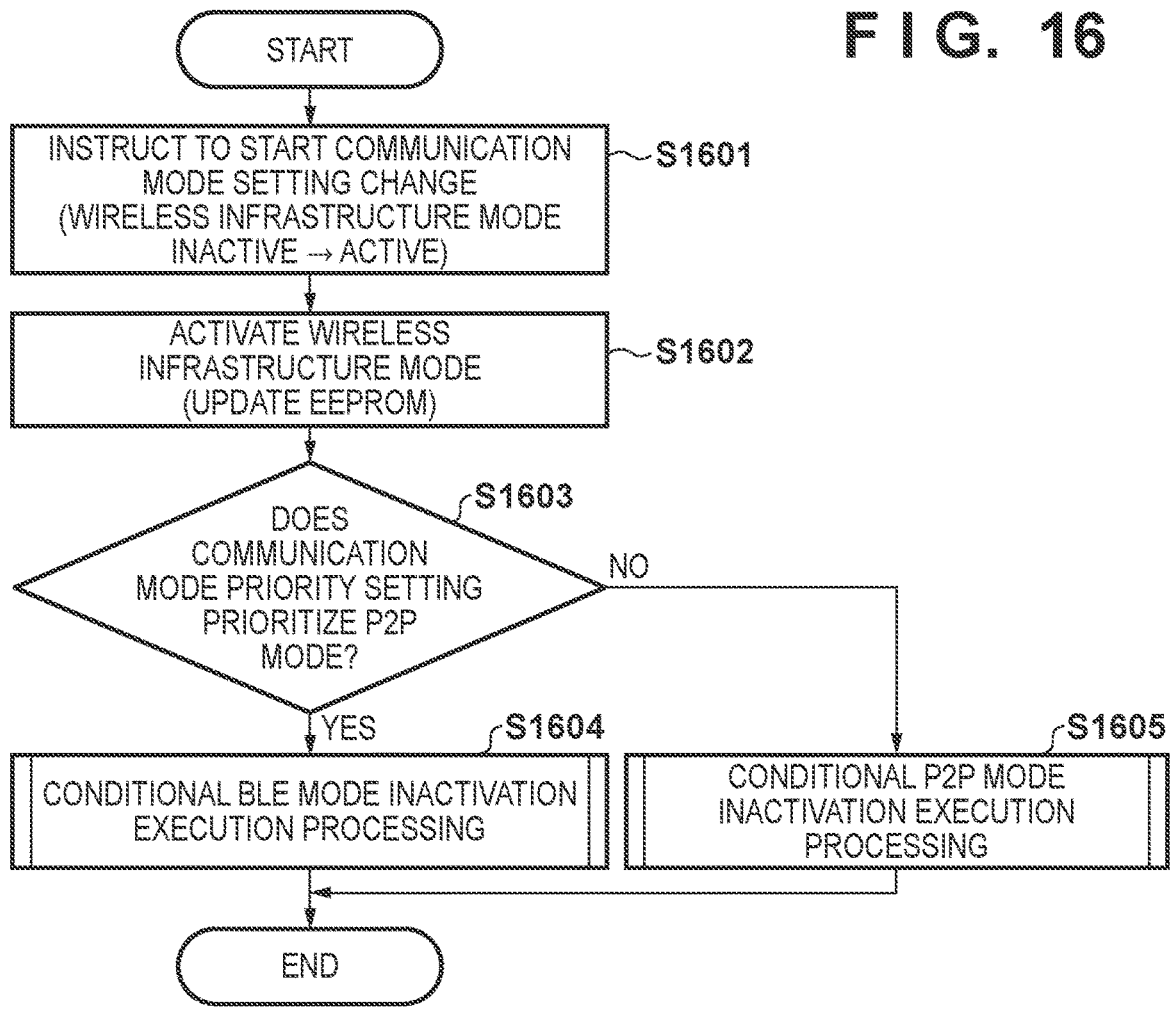
FIG. 16 is a flowchart illustrating switching of the wireless infrastructure mode from an inactive setting to an active setting.

An example of a pattern in which the restrictions on the wireless chip set become a barrier to switching of the interface is switching from communication mode setting 4 in FIG. 14 to another communication mode setting. In the state of communication mode setting 4 in FIG. 14, the P2P mode is activated using the 2.4-GHz band as the use band of the P2P mode and the BLE mode is active. In this state, if the user switches the wireless infrastructure mode from the inactive setting to the active setting on the communication setting screen shown in FIG. 4C, and performs connection to the external access point using the DFS band in the 5-GHz band, the first and second restrictions on the wireless chip set become a barrier. That is, under the first restriction, the channels in the wireless infrastructure mode and the P2P mode need to match each other in order to operate the three modes concurrently. However, under the second restriction, control is executed not to use the DFS function in the P2P mode. Thus, if connection to the external access point has been performed using the DFS use band in the 5-GHz band in the wireless infrastructure mode, the channels in the wireless infrastructure mode and the P2P mode are different from each other. Therefore, if the three communication modes operate concurrently, the communication speed may be limited. FIG. 16 shows a flowchart of the process of switching the communication mode setting to communication mode setting 3 or 14 in FIG. 14 in which the wireless infrastructure mode can be used while avoiding the restrictions.

In step S1601, upon receiving a user operation (a user operation of switching the wireless infrastructure mode from the inactive setting to the active setting) on the communication setting screen shown in FIG. 4C, the CPU 602 switches the wireless infrastructure mode from the inactive setting to the active setting.

In step S1602, the CPU 602 activates the wireless infrastructure setting and saves the setting in the nonvolatile memory 605. In step S1603, the CPU 602 determines whether the P2P mode priority setting is set in the communication mode priority setting saved in the nonvolatile memory 605.

If, as a result of the determination processing, it is determined that the P2P mode priority setting is set in the communication mode priority setting, the process advances to step S1604. In step S1604, the CPU 602 executes the conditional BLE mode inactivation execution processing as indicated in steps S2401 to S2407 of FIG. 24, which has been described in "Switching of Active/Inactive Setting of Interface by LAN Settings". On the other hand, if it is determined that the P2P mode priority setting is not set in the communication mode priority setting, the process advances to step S1605.

In step S1605, the CPU 602 executes processing according to a flowchart shown in FIG. 25. FIG. 25 is a flowchart of conditional P2P mode inactivation execution processing. When switching the wireless infrastructure mode to the active setting in a state in which both the P2P mode and the BLE mode are active and the P2P mode priority setting is set in the communication mode priority setting, it is determined whether to switch the BLE mode to the inactive setting. Then, in accordance with a result of the determination processing, whether to inactivate the BLE mode is switched.

In step S2501, the CPU 602 determines whether the wireless infrastructure mode is active. If, as a result of the determination processing, it is determined that the wireless infrastructure mode is not active, the process advances to step S2507. In step S2507, the CPU 602 saves, in the nonvolatile memory 605, setting of the BLE mode priority setting in the communication mode priority setting.

On the other hand, if it is determined in step S2501 that the wireless infrastructure mode is active, the process advances to step S2502. In step S2502, the CPU 602 determines whether the P2P mode is active.

If, as a result of the determination processing, it is determined in step S2502 that the P2P mode is not active, the process advances to step S2507; otherwise, the process advances to step S2503.

In step S2503, the CPU 602 determines whether connection to the external access point has been performed using the DFS use band in the 5-GHz band. If it is determined in step S2503 that connection to the external access point has been performed using the DFS use band in the 5-GHz band, the process advances to step S2504; otherwise, the process advances to step S2506.

In step S2506, the CPU 602 determines whether the channel used in the wireless infrastructure mode is the same as that used in the P2P mode. If it is determined in step S2506 that the channel used in the wireless infrastructure mode is the same as that used in the P2P mode, the process advances to step S2507; otherwise, the process advances to step S2504.

In step S2504, the CPU 602 displays a notification (image or characters) representing a warning on the operation display unit 305. The notification representing the warning is a notification for notifying the user that the P2P mode is to be stopped. In step S2505, the CPU 602 controls to disable execution of communication in the P2P mode. More specifically, the CPU 602 controls to disable execution of communication in the P2P mode. More specifically, the CPU 602 disables device detection/discovering/data transmission/reception in the P2P mode, and causes the apparatus to transition to a state in which no antenna is used in the P2P mode. Alternatively, to set the inactive setting of the P2P mode, the CPU 602 may save a setting value indicating the inactive setting in the nonvolatile memory 605.

In this embodiment, after executing the warning notification in step S2504, step S2505 is executed. However, step S2505 may be executed by skipping step S2504. That is, processing of controlling to disable execution of communication in the P2P mode may be executed without displaying the notification representing the warning in step S2504.

This processing can start communication in the wireless infrastructure mode while satisfying the first and second restrictions when the wireless infrastructure mode is activated in a state in which the wireless interfaces of the P2P mode and the BLE mode operate concurrently.

Activation of BLE Mode

An example of a pattern in which the restrictions on the wireless chip set become a barrier to switching of the interface is switching from communication mode setting 14 in FIG. 14 to another communication mode setting. In the state of communication mode setting 14 in FIG. 14, connection to the external access point has been performed using the DFS use band in the 5-GHz band in the wireless infrastructure mode and the P2P mode is active in the 2.4-GHz band. In this state, if the user switches the BLE mode from the inactive setting to the active setting on the communication setting screen shown in FIG. 4C, the first and second restrictions on the wireless chip set become a barrier. That is, under the first restriction, the channels in the wireless infrastructure mode and the P2P mode need to match each other in order to operate the three modes concurrently. However, under the second restriction, control is executed not to use the DFS function in the P2P mode. Thus, if connection to the external access point has been performed using the DFS use band in the 5-GHz band in the wireless infrastructure mode, the channels in the wireless infrastructure mode and the P2P mode are different from each other. Therefore, the communication speed may be limited and the throughput may deteriorate. FIG. 17 shows a flowchart of the process of switching the communication mode setting to communication mode setting 3 in FIG. 14 in which the BLE mode can be used while avoiding the restrictions.

In step S1701, upon receiving a user operation (a user operation of switching the BLE mode from the inactive setting to the active setting) on the communication setting screen shown in FIG. 4C, the CPU 602 switches the BLE mode from the inactive setting to the active setting.

In step S1702, the CPU 602 activates the BLE setting and saves the setting in the nonvolatile memory 605. In step S1703, the CPU 602 executes the conditional P2P mode inactivation execution processing as indicated in steps S2501 to S2507 of FIG. 25, which has been described in "Activation of Wireless Infrastructure Mode".

This processing can start communication in the BLE mode while satisfying the first and second restrictions when the BLE mode is activated in a state in which the wireless interfaces of the wireless infrastructure mode and the P2P mode operate concurrently.

As described above, in this embodiment, even if the plurality of communication modes are executed, it is possible to maintain necessary throughput. In the above-described example, the processing is switched in accordance with whether the use band in the wireless infrastructure mode is the DFS band. However, this embodiment is not limited to this. That is, in the above-described example, in step S2503 of FIG. 25, the CPU 602 determines whether connection to the external access point has been performed using the DFS band, and then switches the next step. However, in this embodiment, the CPU 602 may determine in step S2503 whether connection to the external access point has been performed using the 5-GHz band, and then switch the next step. That is, the processing may be switched in accordance with not whether the use frequency band in the wireless infrastructure mode is the DFS band but whether the use frequency band in the wireless infrastructure mode is the 5- or 2.4-GHz band. More specifically, if the 5-GHz band is set as the use frequency band in the wireless infrastructure mode, the MFP 300 controls to disable execution of communication in the P2P mode. On the other hand, if the 2.4-GHz band is set as the use frequency band in the wireless infrastructure mode, the MFP 300 sets, as the use frequency band, in the P2P mode, the same frequency band (channel) as that in the wireless infrastructure mode. As described above, the MFP 300 can simplify the processing by making a setting so any band in the 5-GHz band is not used in the P2P mode.

Inactivation of P2P Mode

Figure 18:
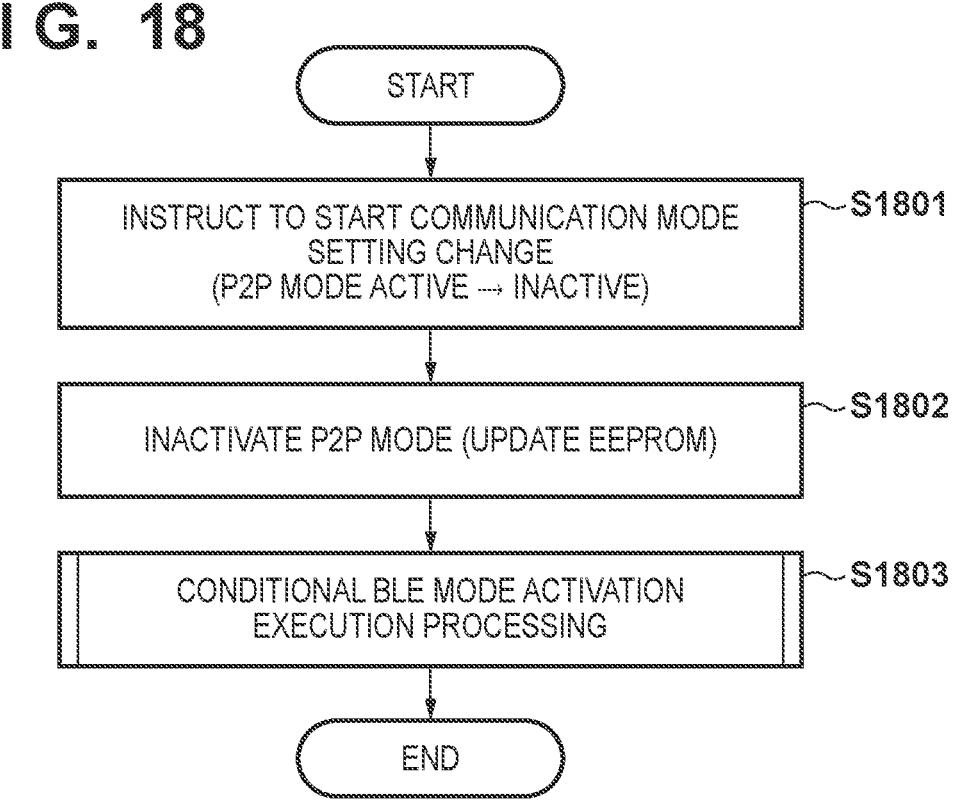
FIG. 18 is a flowchart illustrating switching of the P2P mode (WFD or software AP mode or the like) from the active setting to the inactive setting.

An example of a pattern in which the communication mode inactivated to avoid the restrictions on the wireless chip set is autonomously activated is switching from communication mode setting 14 in FIG. 14 to another communication mode setting. In the state of communication mode setting 14 in FIG. 14, connection to the external access point has been performed using the DFS use band in the 5-GHz band in the wireless infrastructure mode and the P2P mode is active in the 2.4-GHz band. Furthermore, a state in which the BLE mode is switched to the inactive setting to avoid the restrictions on the wireless chip set in that state will be exemplified. In this embodiment, in this state, if the user switches the P2P mode from the active setting to the inactive setting on the communication setting screen shown in FIG. 4C, the MFP 300 autonomously activates the BLE mode. FIG. 18 shows a flowchart of the process of switching the communication mode setting to communication mode setting 3 in FIG. 14 in which the BLE mode can be used.

In step S1801, upon receiving a user operation (a user operation of switching the P2P mode from the active setting to the inactive setting) on the communication setting screen shown in FIG. 4C, the CPU 602 switches the P2P mode from the active setting to the inactive setting.

In step S1802, the CPU 602 inactivates the P2P setting and saves the setting in the nonvolatile memory 605. In step S1803, the CPU 602 performs processing according to a flowchart shown in FIG. 26.

Figure 26:
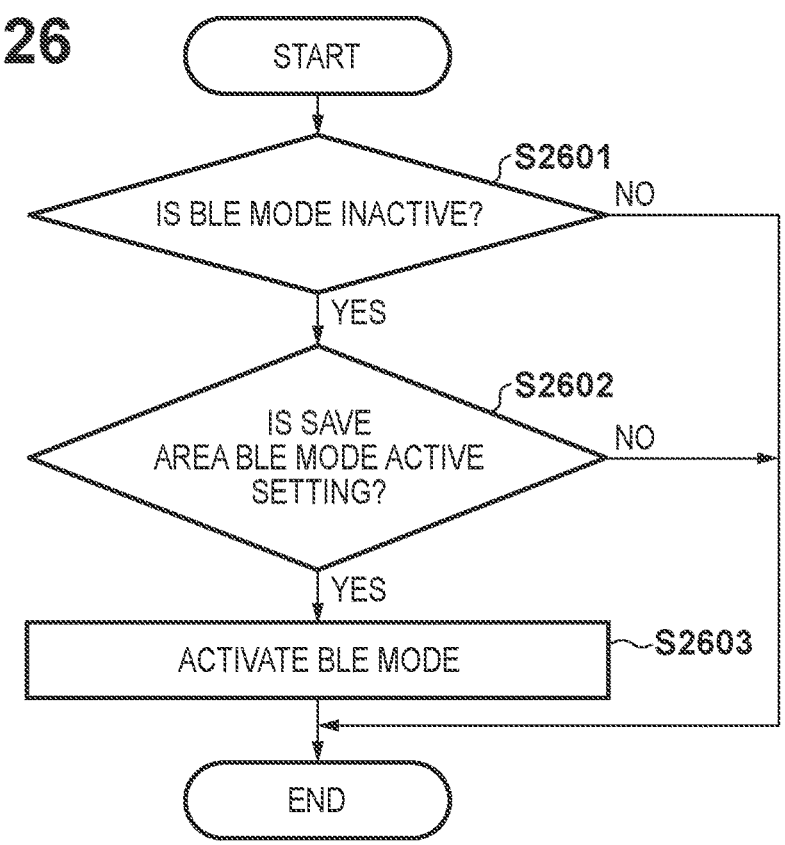
FIG. 26 is a flowchart of conditional BLE mode activation execution processing.

FIG. 26 is a flowchart of conditional BLE mode activation execution processing, and is a flowchart illustrating processing of switching, to the active setting, the BLE mode that has been stopped in the conditional BLE mode inactivation execution processing shown in FIG. 24.

In step S2601, the CPU 602 determines whether the current state is a state in which communication in the BLE mode is executable. The state in which communication in the BLE mode is executable indicates a state in which device detection/discovering/data transmission/reception in the BLE mode is possible and the antenna is usable in the BLE mode. If it is determined in step S2601 that the current state is the state in which communication in the BLE mode is executable, the processing according to the flowchart shown in FIG. 26 ends; otherwise, the process advances to step S2602.

In step S2602, the CPU 602 determines whether the setting value of the BLE mode saved in the save area of the nonvolatile memory 605 indicates the active setting. That is, the CPU 602 determines whether the setting value of the BLE mode indicates the active setting. If it is determined in step S2602 that the setting of the BLE mode saved in the save area of the nonvolatile memory 605 indicates the active setting, the process advances to step S2603; otherwise; the processing according to the flowchart shown in FIG. 26 ends. In step S2603, the CPU 602 activates the setting state of the BLE mode, and saves the setting value in the nonvolatile memory 605. This processing can autonomously activate the BLE mode that has been inactivated to avoid the restrictions on the wireless chip set. Thus, communication in the BLE mode becomes executable.

Inactivation of Wireless Infrastructure Mode

An example of a pattern in which the communication mode inactivated to avoid the restrictions on the wireless chip set is autonomously activated is switching from communication mode setting 14 in FIG. 14 to another communication mode setting. In the state of communication mode setting 14 in FIG. 14, connection to the external access point has been performed using the DFS use band in the 5-GHz band in the wireless infrastructure mode and the P2P mode is active in the 2.4-GHz band. Furthermore, a state in which the BLE mode is switched to the inactive setting to avoid the restrictions on the wireless chip set in that state will be exemplified. In this embodiment, in this state, if the user switches the wireless infrastructure mode from the active setting to the inactive setting on the communication setting screen shown in FIG. 4C, the MFP 300 autonomously activates the BLE mode. FIG. 19 shows a flowchart of processing of switching the communication mode setting to communication mode setting 4 in FIG. 14 in which the BLE mode can be used.

In step S1901, upon receiving a user operation (a user operation of switching the wireless infrastructure mode from the active setting to the inactive setting) on the communication setting screen shown in FIG. 4C, the CPU 602 switches the wireless infrastructure mode from the active setting to the inactive setting.

In step S1902, the CPU 602 inactivates the wireless infrastructure setting and saves the setting in the nonvolatile memory 605. In step S1903, the CPU 602 executes processing according to a flowchart shown in FIG. 27.

Figure 27:
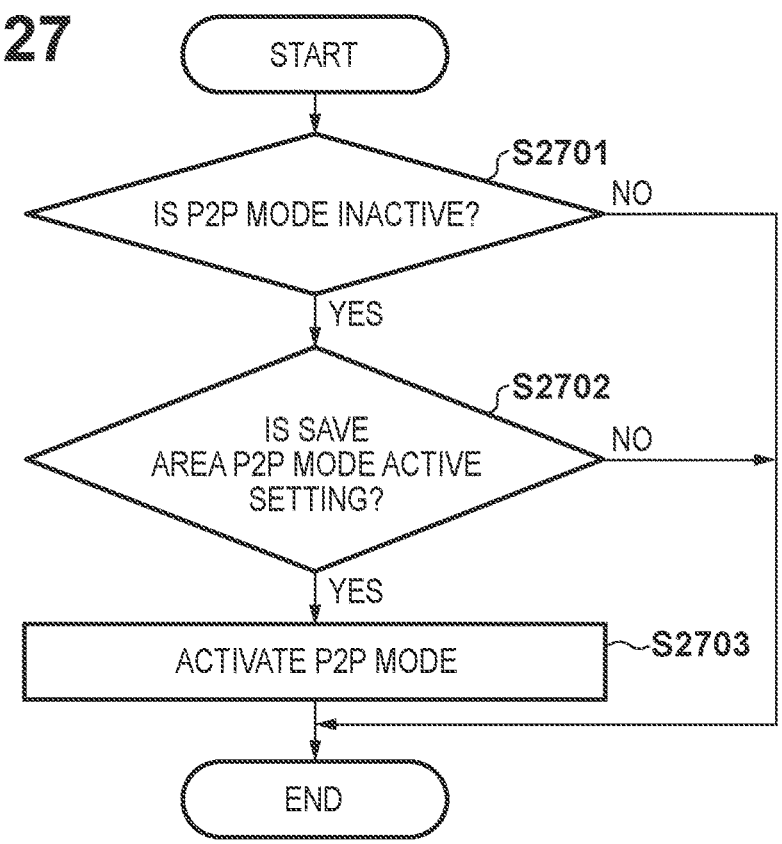
FIG. 27 is a flowchart of conditional P2P mode activation execution processing.

FIG. 27 is a flowchart of conditional P2P mode activation execution processing, and is a flowchart illustrating processing of switching, to the active setting, the P2P mode that has been stopped in the conditional P2P mode inactivation execution processing shown in FIG. 25.

In step S2701, the CPU 602 determines whether the current state is a state in which communication in the P2P mode is executable. The state in which communication in the P2P mode is executable indicates a state in which device detection/discovering/data transmission/reception in the P2P mode is possible and the antenna is usable in the P2P mode. If it is determined in step S2701 that the current state is the state in which communication in the P2P mode is executable, the processing according to the flowchart shown in FIG. 27 ends; otherwise, the process advances to step S2702.

In step S2702, the CPU 602 determines whether the P2P mode setting saved in the save area of the nonvolatile memory 605 indicates the active setting. That is, the CPU 602 determines whether the setting state of the P2P mode indicates the active setting. If it is determined in step S2702 that the setting value of the P2P mode saved in the save area of the nonvolatile memory 605 indicates the active setting, the process advances to step S2703; otherwise; the processing according to the flowchart shown in FIG. 27 ends. In step S2703, the CPU 602 activates the setting state of the P2P mode, and saves the setting value in the nonvolatile memory 605. Thus, communication in the P2P mode becomes executable.

Referring back to FIG. 19, in step S1904, the CPU 602 executes the conditional BLE mode activation execution processing shown in FIG. 26, which has been described in "Inactivation of P2P mode" in "Switching of Active/Inactive Setting of Interface by LAN Settings". This processing can autonomously activate the communication mode that has been inactivated to avoid the restrictions on the wireless chip set.

Inactivation of BLE Mode

Figure 20:
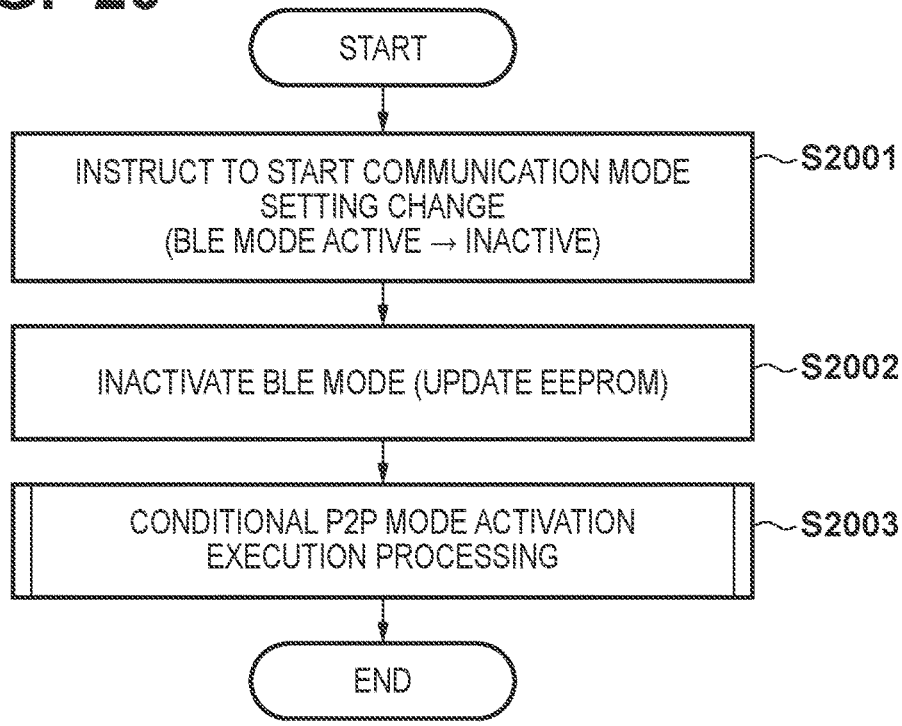
FIG. 20 is a flowchart illustrating switching of the BLE mode from the active setting to the inactive setting.

An example of a pattern in which the communication mode inactivated to avoid the restrictions on the wireless chip set is autonomously activated is switching from communication mode setting 3 in FIG. 14 to another communication mode setting. In the state of communication mode setting 3 in FIG. 14, connection to the external access point has been performed using the DFS use band in the 5-GHz band in the wireless infrastructure mode and the BLE mode is active. Furthermore, a state in which the P2P mode is switched to the inactive setting will be exemplified. In this embodiment, in this state, if the user switches the BLE mode from the active setting to the inactive setting on the communication setting screen shown in FIG. 4C, the P2P mode is autonomously activated. FIG. 20 shows a flowchart of the process of switching the communication mode setting to communication mode setting 14 in FIG. 14 in which the P2P mode can be used.

In step S2001, upon receiving a user operation (a user operation of switching the BLE mode from the active setting to the inactive setting) on the communication setting screen shown in FIG. 4C, the CPU 602 switches the BLE mode from the active setting to the inactive setting.

In step S2002, the CPU 602 inactivates the BLE setting and saves the setting in the nonvolatile memory 605. In step S2003, the CPU 602 executes the conditional P2P mode activation execution processing shown in FIG. 27, which has been described in "Inactivation of Wireless Infrastructure Mode". This processing can autonomously activate the communication mode that has been inactivated to avoid the restrictions on the wireless chip set.

<Manual Setup for Wireless Communication>

Figure 21:
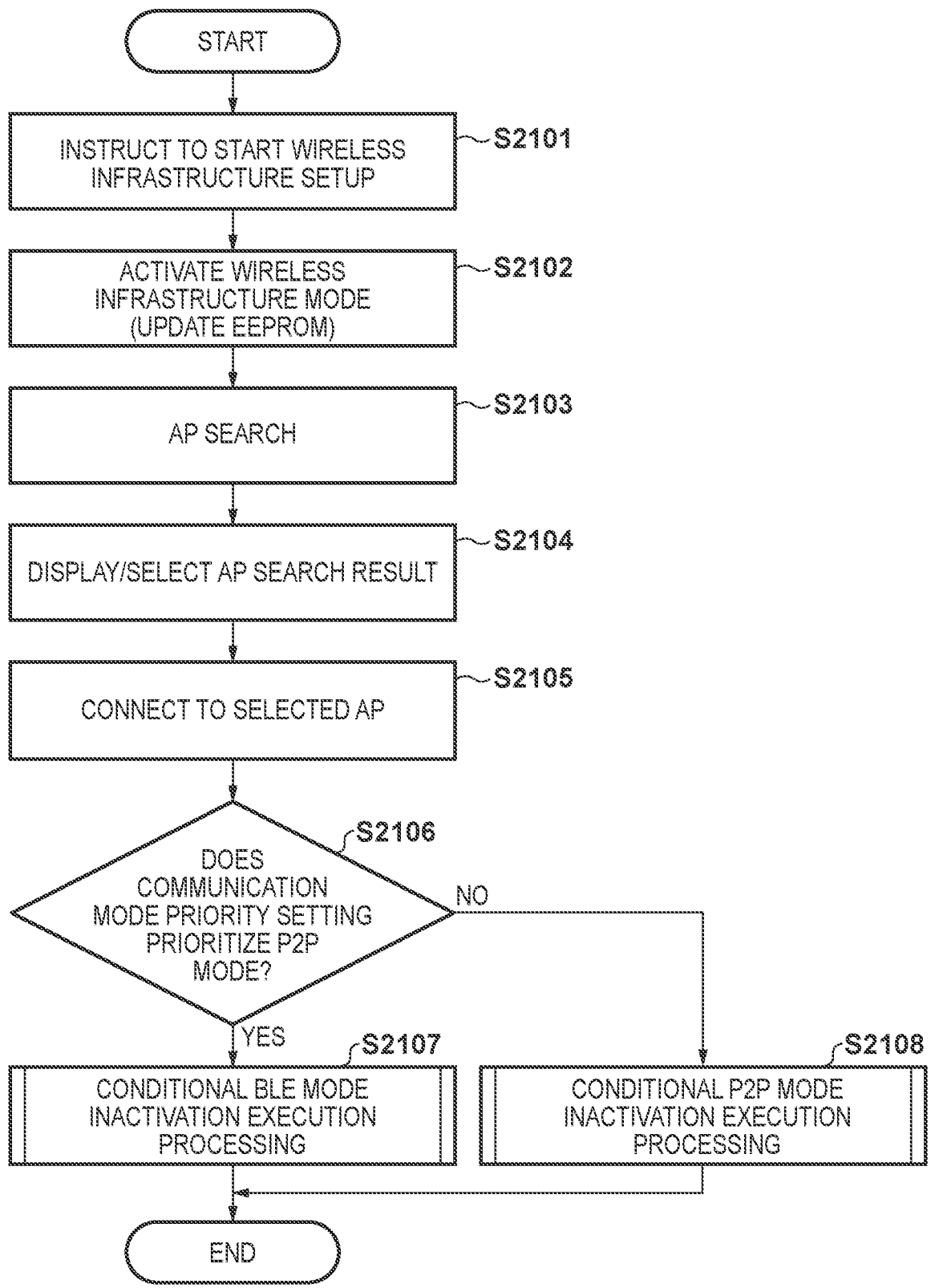
FIG. 21 is a flowchart illustrating a manual setup for the wireless infrastructure mode executed in the MFP 300.

A method of switching the active/inactive setting of each of the communication modes of the wireless infrastructure mode/P2P mode/BLE mode at the time of a manual setup for wireless communication will be described next. FIG. 21 is a flowchart illustrating a manual setup for the wireless infrastructure mode executed in the MFP 300. Note that the BLE mode will be exemplified as a description of the BT mode but the BT Classic mode is also applicable in this embodiment.

Processes in steps S2101 to S2105 indicate a manual setup. In the manual setup processing, when the wireless infrastructure mode is activated (step S2102), peripheral external access points are searched for by a user instruction (step S2103). Then, a list of the found peripheral external access points is displayed on the operation display unit 305 of the MFP 300 (step S2104). The user can manually select a desired external access point from the displayed list, and the CPU 602 performs processing for connecting the MFP 300 to the selected access point (step S2105). After connecting the MFP 300 to the external access point in the manual setup, the process advances to step S2106.

In step S2106, the CPU 602 determines whether the P2P mode priority setting is set in the communication mode priority setting saved in the nonvolatile memory 605. If it is determined in step S2106 that the P2P mode priority setting is set in the communication mode priority setting, the process advances to step S2107. In step S2107, the CPU 602 executes the conditional BLE mode inactivation execution processing shown in FIG. 24, which has been described in "Switching of Active/Inactive Setting of Interface by LAN Settings".

On the other hand, if it is determined in step S2106 that the P2P mode priority setting is not set in the communication mode priority setting, the process advances to step S2108. In step S2108, the CPU 602 executes the conditional P2P mode inactivation execution processing shown in FIG. 25, which has been described in "Activation of Infrastructure Mode" in "Switching of Active/Inactive Setting of Interface by LAN Settings".

As described above, in this embodiment, when the plurality of wireless interfaces complying with the plurality of wireless communication standards operate concurrently, there are the first and second restrictions. Thus, in the processing in step S2107 or S2108, control is executed in consideration of the restrictions by switching the setting (active (ON)/inactive (OFF) setting) of the BLE mode or the P2P mode.

As described above, there is a case in which the wireless infrastructure mode is activated in the manual setup in a state in which the plurality of wireless interfaces of the P2P mode and the BT mode operate concurrently. If the wireless infrastructure mode and the P2P mode operate using the same channel, concurrent communication by the three interfaces of communication in the wireless infrastructure mode, communication in the P2P mode, and communication in the BLE mode is activated in the processing procedure. On the other hand, connection to the external access point may have been performed using the DFS use band in the 5-GHz band or the wireless infrastructure mode and the P2P mode may not operate using the same channel. In this case, in the processing procedure, control is executed to activate concurrent communication by the two interfaces of communication in the wireless infrastructure mode and communication in the P2P mode and to disable execution of communication in the BLE mode. Alternatively, in the processing procedure, control is executed to activate concurrent communication by the two interfaces of communication in the wireless infrastructure mode and communication in the BLE mode and to disable execution of communication in the P2P mode. This can start communication in the wireless infrastructure mode while maintaining throughput in consideration of the first and second restrictions.

<Automatic Setup for Wireless Communication>

Figure 22:
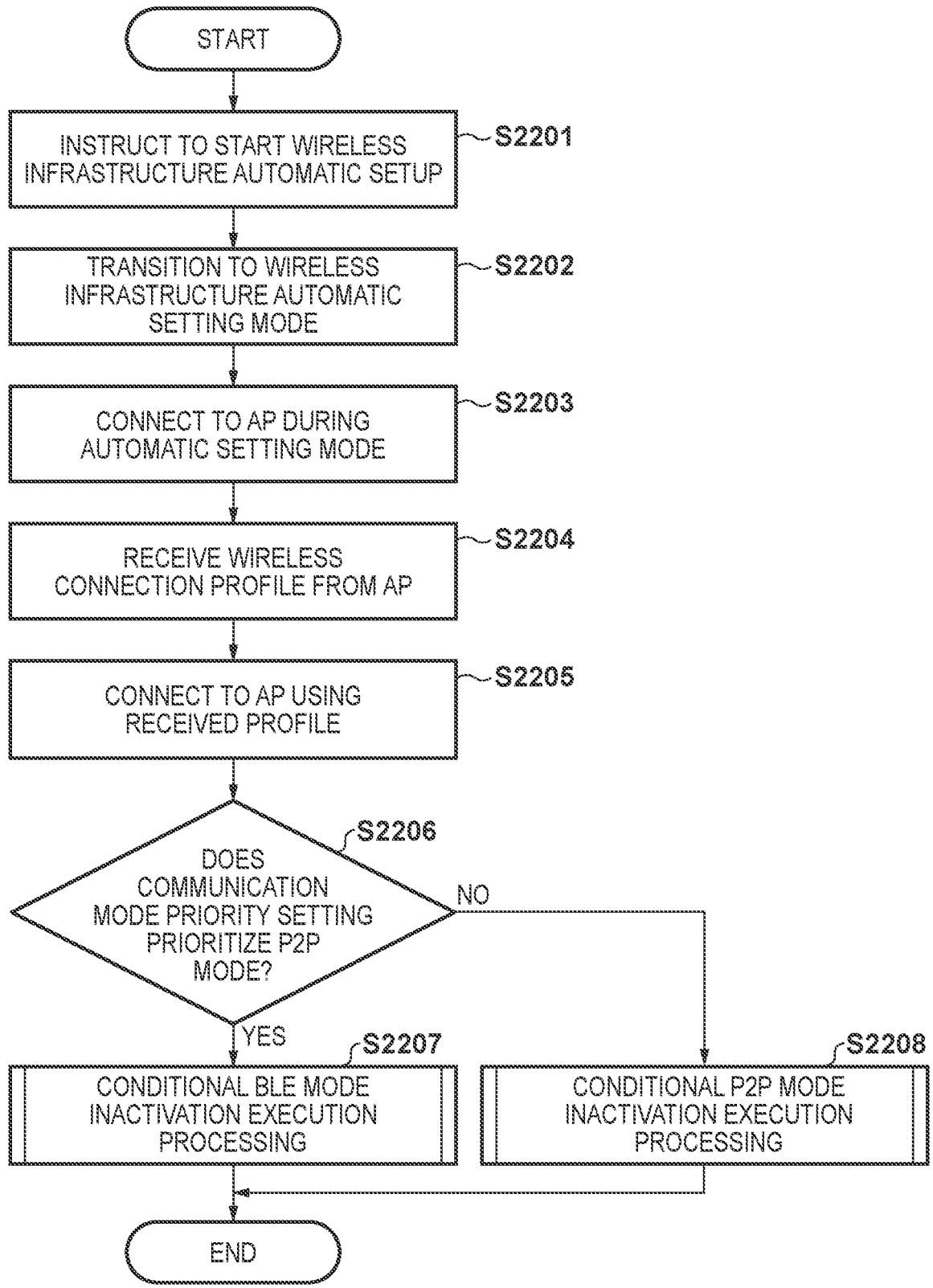
FIG. 22 is a flowchart illustrating an automatic setup for the wireless infrastructure mode executed in the MFP 300.

A method of switching the active/inactive setting of each of the communication modes of the wireless infrastructure mode/P2P mode/BLE mode at the time of an automatic setup for wireless communication will be described next. An automatic setup is called so because an external access point as a connection destination can be automatically selected by a push button or PIN code method. More specifically, there are provided a method such as WPS (Wi-Fi Protected Setup®), AOSS (AirStation One-Touch Secure System®), and Easy Wireless Start®. At the time of an automatic setup for wireless communication, an attempt is made to perform connection in order for prioritizing one of the 2.4- and 5-GHz bands from pieces of frequency information of wireless parameters obtained from external access points. FIG. 22 is a flowchart illustrating an automatic setup for the wireless infrastructure mode performed by the MFP 300. Note that the BLE mode will be exemplified as a description of the BT mode but the BT Classic mode is also applicable in this embodiment.

In step S2201, by a user operation on the operation display unit 305, the CPU 602 receives a request to transition to an automatic setup mode for the wireless infrastructure mode, and the process advances to step S2202.

In step S2202, the CPU 602 transitions to the automatic setup mode for the wireless infrastructure mode. In step S2203, the CPU 602 performs connection to the external access point 400 during the automatic setup for the wireless infrastructure mode. After performing connection, in step S2204, the CPU 602 receives a wireless connection profile from the access point 400. One wireless connection profile includes "SSID", "frequency", "authentication method", "encryption method", and "passphrase".

In step S2205, the CPU 602 performs connection processing in the wireless infrastructure mode based on the wireless connection profile received in step S2204. After performing connection to the external access point in the automatic setup, the process advances to step S2206. Steps S2206 to S2208 are the same as steps S2106 to S2108 described above and a description thereof will be omitted. This can start communication in the wireless infrastructure mode while maintaining throughput in consideration of the first and second restrictions, similar to the manual setup for wireless communication.

<Change of Channel of Wireless Infrastructure Mode>

Figure 23A:
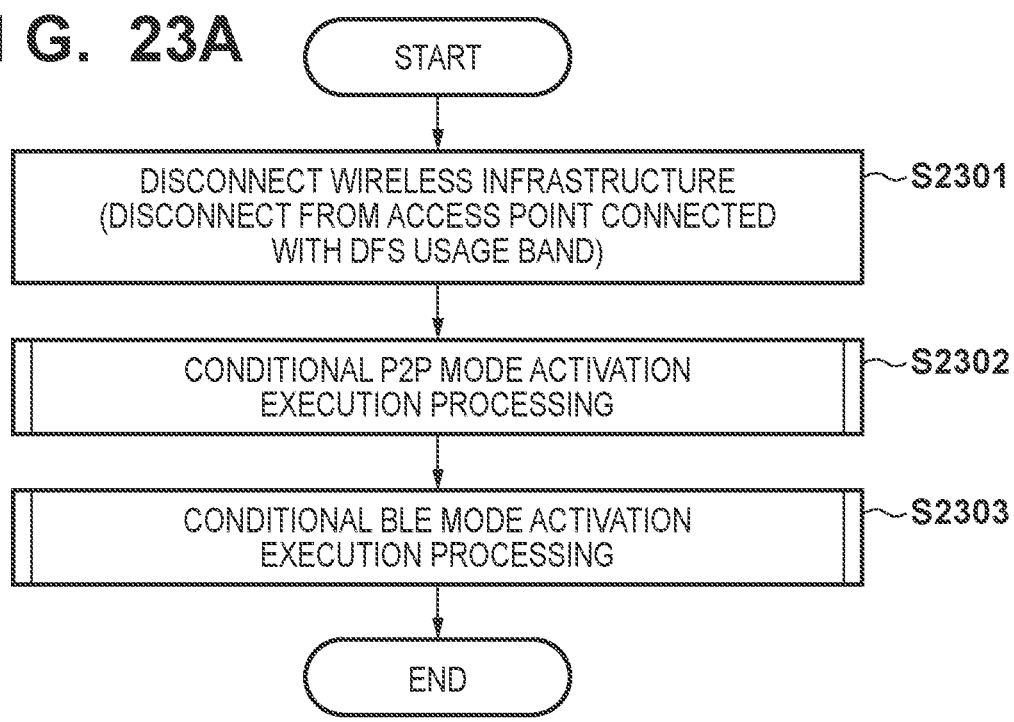
FIG. 23A is a flowchart illustrating a change of a channel from the DFS use band in the 5-GHz band in the wireless infrastructure mode executed in the MFP 300.

A method of switching the active/inactive setting of each of the communication modes of the wireless infrastructure mode/P2P mode/BLE mode at the time of a change of the channel of the wireless infrastructure mode will be described next. Note that the BLE mode will be exemplified as a description of the BT mode but the BT Classic mode is also applicable in this embodiment. FIG. 23A is a flowchart illustrating a change of the channel from the DFS use band in the 5-GHz band in the wireless infrastructure mode executed in the MFP 300.

In step S2301, the CPU 602 performs disconnection processing from the external access point connected by the DFS use band by changing the channel of the wireless infrastructure mode, and the process advances to step S2302.

In step S2302, the CPU 602 executes the conditional P2P mode activation execution processing shown in FIG. 27, which has been described in "Inactivation of Infrastructure Mode" in "Switching of Active/Inactive Setting of Interface by LAN Settings".

In step S2303, the CPU 602 executes the conditional BLE mode activation execution processing shown in FIG. 26, which has been described in "Inactivation of P2P Mode" in "Switching of Active/Inactive Setting of Interface by LAN Settings".

This processing can autonomously activate the communication mode that has been inactivated to avoid the restrictions on the wireless chip set.

Figure 23B:
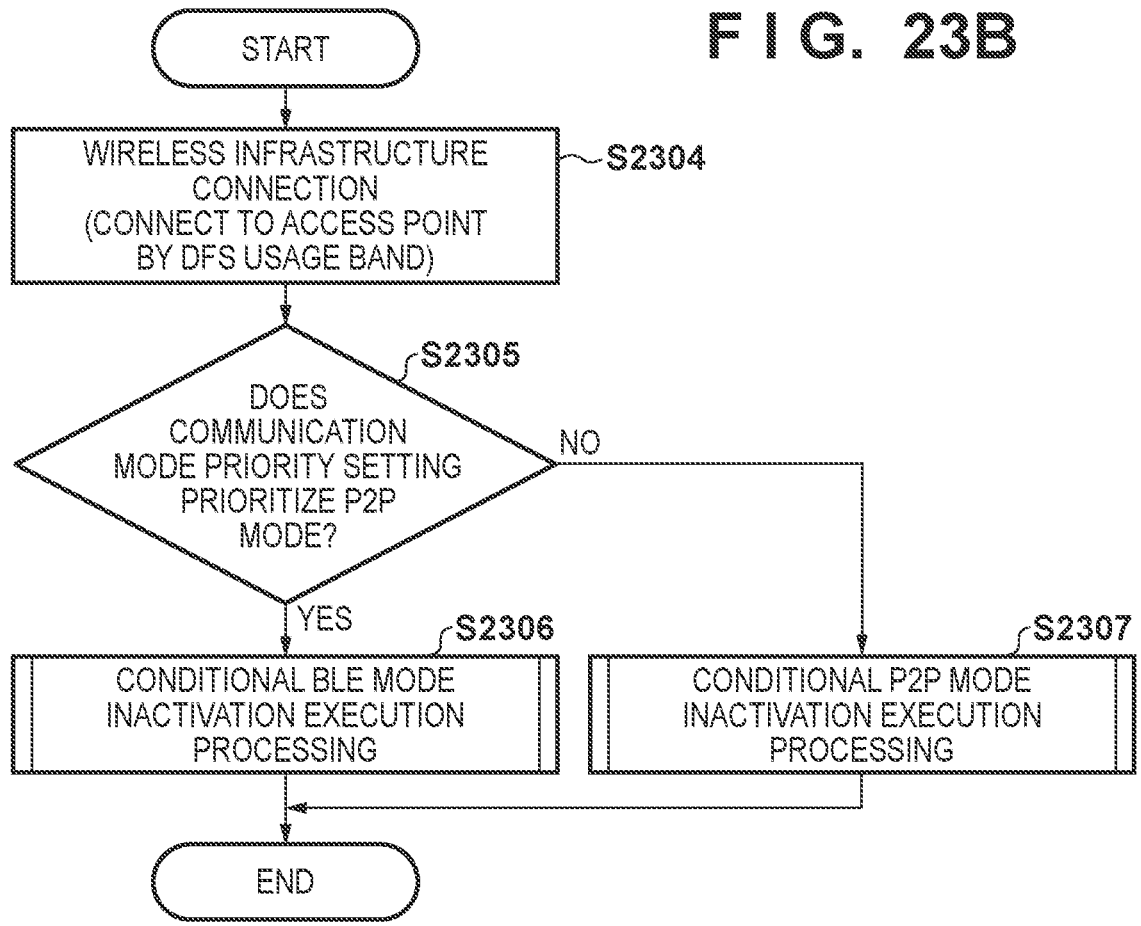
FIG. 23B is a flowchart illustrating a change of a channel to the DFS use band in the 5-GHz band in the wireless infrastructure mode executed in the MFP 300.

FIG. 23B is a flowchart illustrating a change of the channel to the DFS use band in the 5-GHz band in the wireless infrastructure mode executed in the MFP 300.

In step S2304, the CPU 602 performs connection processing to the external access point using the DFS use band by changing the channel of the wireless infrastructure mode, and the process advances to step S2305.

In step S3205, the CPU 602 determines whether the P2P mode priority setting is set in the communication mode priority setting saved in the nonvolatile memory 605. If it is determined in step S2305 that the P2P mode priority setting is set in the communication mode priority setting, the process advances to step S2306. In step S2306, the CPU 602 executes the conditional BLE mode inactivation execution processing shown in FIG. 24, which has been described in "Switching of Active/Inactive Setting of Interface by LAN Settings".

On the other hand, if it is determined in step S2305 that the P2P mode priority setting is not set in the communication mode priority setting, the process advances to step S2307. In step S2307, the CPU 602 executes the conditional P2P mode inactivation execution processing shown in FIG. 25, which has been described in "Activation of Infrastructure Mode" in "Switching of Active/Inactive Setting of Interface by LAN Settings". This processing can start communication in the wireless infrastructure mode while maintaining throughput in consideration of the first and second restrictions, similar to the manual setup for wireless communication.

According to this embodiment, if the communication modes complying with the plurality of communication standards can be operated concurrently and there are the above-described two restrictions, the active/inactive state of each communication mode is switched in accordance with a combination of frequency bands used by the respective wireless interfaces. This control implements connection in the communication mode in which throughput can be maintained.

Second Embodiment

In the first embodiment, the wireless LAN and Bluetooth standards have been exemplified as examples of the communication interface to be used. However, other wireless communication standards can also be used. For example, the first embodiment is also applicable to a case in which it is possible to add/change the wireless LAN communication standard or use a new wireless communication standard.

Furthermore, the 2.4- and 5-GHz bands have been exemplified as examples of the frequency band to be used but the first embodiment is also applicable to a case in which a new frequency band becomes usable by adding/changing the wireless communication standard, as described above. Furthermore, the DFS band has been exemplified as an example of the specific frequency band but other frequency bands can be applied.

In the first embodiment, the communication apparatus in which the wireless infrastructure mode and the P2P mode such as the WFD or software AP mode complying with the wireless LAN communication standard, and the BT mode complying with the Bluetooth standard can operate concurrently has been exemplified. However, the first embodiment is also applicable to not only the communication apparatus in which the three communication modes complying with the two communication standards (Wi-Fi and BT standards) can operate concurrently but also to a communication apparatus in which two communication modes complying with two communication standards can operate concurrently.

In the first embodiment, a description has been provided by assuming a case in which in the case of the wireless combo unit operating by one CPU and one antenna, it is possible to wait for communications of up to only two channels in order to satisfy the conventional throughput. However, the present invention is not limited to this. If, for example, up to three channels can be used concurrently and four communication modes are executed, processing of stopping one of the communication modes except for the wireless infrastructure mode may be executed.

The arrangements of the various screens and their operation methods described in the first embodiment are not limited to the above examples. The various numerical values used in the above description are merely examples for a detailed description, and the first embodiment is not intended to limit them.

Some or all of the above-described embodiments may appropriately be combined and used. In addition, some or all of the above-described embodiments may selectively be used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

According to the arrangement of the present invention, it is possible to implement communication while maintaining necessary throughput.

The invention claimed is:

1. A communication apparatus capable of executing wireless communication using a first frequency band and wireless communication using a second frequency band including a specific frequency band, comprising:
   a communication device, and
   at least one memory and at least one processor which function as:
   a control unit configured to control the communication device,
   wherein the communication device can execute a first communication mode for allowing wireless communication with an information processing apparatus via an external access point, a second communication mode for allowing the communication apparatus to function as a master station without intervention of the external access point to perform wireless communication with the information processing apparatus serving as a slave station, and a third communication mode of a standard different from standards of the first communication mode and the second communication mode, and
   wherein the control unit controls not to execute communication in either the second communication mode or the third communication mode based on a frequency band used in the first communication mode.

2. The communication apparatus according to claim 1, wherein
   in the first communication mode, the control unit can set, as a frequency band to be used by the communication device for communication, either the first frequency band or the second frequency band including the specific frequency band, and
   in the second communication mode, the control unit can set the second frequency band as the frequency band to be used by the communication device for communication, and does not set the specific frequency band.

3. The communication apparatus according to claim 1, wherein the first frequency band is a 2.4-GHz frequency band and the second frequency band is a 5-GHz frequency band.

4. The communication apparatus according to claim 3, wherein in the second communication mode, the communication device can perform communication using the 5-GHz frequency band except for the specific frequency band.

5. The communication apparatus according to claim 1, wherein if the specific frequency band is set as the frequency band in the first communication mode, the control unit sets, as the frequency band in the second communication mode, a frequency band different from the specific frequency band, and controls not to execute communication in the third communication mode.

6. The communication apparatus according to claim 1, wherein if the 5-GHz frequency band except for the specific frequency band is set as the frequency band in the first communication mode, the control unit sets, as the frequency band in the second communication mode, the same frequency band as the frequency band in the first communication mode.

7. The communication apparatus according to claim 1, wherein if the 2.4-GHz frequency band is set as the frequency band in the first communication mode, the control unit sets, as the frequency band in the second communication mode, the same frequency band as the frequency band in the first communication mode.

8. The communication apparatus according to claim 1, characterized in that if the 5-GHz frequency band is set as the frequency band in the first communication mode, the control unit sets the 2.4-GHz frequency band as the frequency band in the second communication mode, and controls not to execute communication in the third communication mode.

9. The communication apparatus according to claim 1, wherein if the specific frequency band is set as the frequency band in the first communication mode, control is executed not to execute communication in the second communication mode.

10. The communication apparatus according to claim 1, wherein if the 5-GHz frequency band is set as the frequency band in the first communication mode, the control unit controls not to execute communication in the second communication mode.

11. The communication apparatus according to claim 1, wherein the specific frequency band is a frequency band in the 5-GHz frequency band, in which a DFS (Dynamic Frequency Selection) function needs to be applied.

12. The communication apparatus according to claim 1, wherein the specific frequency band includes a 5.3-GHz band and a 5.6-GHz band.

13. The communication apparatus according to claim 1, wherein the communication device executes the first communication mode and the second communication mode by communication complying with an IEEE802.11 series, and executes the third communication mode by communication complying with an IEEE802.15.1.

14. The communication apparatus according to claim 1, wherein the at least one memory and the at least one processor further function as a print control unit configured to receive data transmitted from the information processing apparatus by wireless communication by the communication device and execute printing.

15. A non-transitory computer-readable storage medium storing a program for causing a computer capable of executing wireless communication using a first frequency band and wireless communication using a second frequency band including a specific frequency band to function as:
   a communication unit configured to allow to execute a first communication mode for allowing wireless communication with an information processing apparatus via an external access point, a second communication mode for allowing the communication apparatus to function as a master station without intervention of the external access point to perform wireless communication with the information processing apparatus serving as a slave station, and a third communication mode of a standard different from standards of the first communication mode and the second communication mode; and
   a control unit configured to control the communication unit,
   wherein the control unit controls not to execute communication in either the second communication mode or the third communication mode based on a frequency band used in the first communication mode.

16. A control method for a communication apparatus capable of executing wireless communication using a first frequency band and wireless communication using a second frequency band including a specific frequency band, comprising:
   causing a communication unit to execute a first communication mode for allowing wireless communication with an information processing apparatus via an external access point, a second communication mode for allowing the communication apparatus to function as a master station without intervention of the external access point to perform wireless communication with the information processing apparatus serving as a slave station, and a third communication mode of a standard different from standards of the first communication mode and the second communication mode,
   wherein control is executed not to execute communication in either the second communication mode or the third communication mode based on the frequency band used in the first communication mode.

* * * * *